United States Patent
Wu et al.

(10) Patent No.: US 8,744,525 B2
(45) Date of Patent: *Jun. 3, 2014

(54) METHODS FOR HANDLING PACKET-SWITCHED DATA TRANSMISSIONS BY MOBILE STATION WITH SUBSCRIBER IDENTITY CARDS AND SYSTEMS UTILIZING THE SAME

(75) Inventors: Chun-Ying Wu, Taipei County (TW); Yu-Syuan Jheng, Luodong Township, Yilan County (TW)

(73) Assignee: MediaTek Inc., Hsin-Chu (TW)

( * ) Notice: Subject to any disclaimer, the term of this patent is extended or adjusted under 35 U.S.C. 154(b) by 202 days.

This patent is subject to a terminal disclaimer.

(21) Appl. No.: 13/339,612

(22) Filed: Dec. 29, 2011

(65) Prior Publication Data
US 2012/0100843 A1    Apr. 26, 2012

Related U.S. Application Data

(63) Continuation of application No. 12/416,300, filed on Apr. 1, 2009, now Pat. No. 8,126,509.

(60) Provisional application No. 61/085,469, filed on Aug. 1, 2008.

(51) Int. Cl.
    *H04B 1/38*    (2006.01)
(52) U.S. Cl.
    USPC .......................................... 455/559; 455/558
(58) Field of Classification Search
    USPC .......... 455/559, 558, 404.2, 41.1, 432.1, 458, 455/550.1, 552.1, 553.1, 416, 417, 425, 418
    See application file for complete search history.

(56) References Cited

U.S. PATENT DOCUMENTS

| | | | |
|---|---|---|---|
| 7,466,674 B2 | 12/2008 | Okagawa et al. | |
| 8,126,509 B2 * | 2/2012 | Wu et al. ...................... | 455/559 |
| 8,139,587 B2 | 3/2012 | Larsson et al. | |
| 2002/0126685 A1 | 9/2002 | Leatherbury et al. | |
| 2003/0031150 A1 | 2/2003 | Yukie | |
| 2003/0088767 A1 | 5/2003 | Emerson, III | |
| 2003/0125073 A1 | 7/2003 | Tsai et al. | |
| 2003/0189922 A1 | 10/2003 | Howe | |
| 2005/0176466 A1 | 8/2005 | Verloop et al. | |
| 2006/0056407 A1 | 3/2006 | Hashimoto et al. | |
| 2006/0159088 A1 | 7/2006 | Aghvami et al. | |
| 2008/0293394 A1 | 11/2008 | Silver et al. | |
| 2011/0281589 A1 | 11/2011 | De Beer | |

FOREIGN PATENT DOCUMENTS

| | | |
|---|---|---|
| CN | 1496154 | 5/2004 |
| CN | 101103597 | 1/2008 |
| WO | WO 2006/052171 | 5/2006 |

* cited by examiner

*Primary Examiner* — Joseph Lauture
(74) *Attorney, Agent, or Firm* — McClure, Qualey & Rodack, LLP

(57) ABSTRACT

A method for handling packet-switched data transmissions by a mobile station with a first subscriber identity card coupled to a first radio frequency (RF) module and a second subscriber identity card coupled to a second RF module, executed by an adapter of the mobile station, is provided. An uplink Internet protocol (IP) packet is received. Information regarding at least one of the received packet and hardware status of the mobile station is collected. One subscriber identity card is determined from the first and second subscriber identity cards according to the collected information. The received packet is transmitted to an IP network via the RF module corresponding to the determined subscriber identity card.

21 Claims, 30 Drawing Sheets

| Port number | Service type | Assigned subscriber identity card |
|---|---|---|
| 20 | FTP (data) | Card A |
| 21 | FTP (control) | Card A |
| 25 | SMTP | Card B |
| 80 | HTTP | Card B |
| 110 | POP3 | Card B |
| 143 | IMAP4 | Card B |
| 220 | IMAP | Card B |
| 443 | HTTPS | Card B |
| 465 | SMTP over SSL/TLS | Card B |
| 989 | FTP (data) over SSL/TLS | Card A |
| 990 | FTP (control) over SSL/TLS | Card A |
| 993 | IMAP4 over SSL | Card B |
| 995 | POP3 over SSL | Card B |
| 2948 | WAP | Card B |

FIG. 12

| Original source address | Modified source address | Destination port number | Service Type | Assigned subscriber identity card |
|---|---|---|---|---|
| 10.1.1.15 | 221.120.0.79 | 20 | FTP(data) | Card A |
| 140.112.2.5 | 221.120.0.79 | 21 | FTP(control) | Card A |
| 209.85.145.68 | 116.59.15.103 | 25 | SMTP | Card B |
| 209.131.34.56 | 116.59.15.103 | 80 | HTTP | Card B |

FIG. 15

| Protocol type | Source address | Source port number | Destination address | Destination port number | Assigned subscriber identity card |
|---|---|---|---|---|---|
| TCP | 10.1.1.15 | 5589 | 348.24.10.99 | 21 | Card A |
| UDP | 10.1.1.23 | 1348 | 210.63.74.92 | 5566 | Card A |
| TCP | 10.1.1.23 | 4567 | 234.568.7.26 | 1144 | Card B |
| UDP | 10.1.1.15 | 6658 | 215.48.96.63 | 8745 | Card B |

FIG. 17

| File type of HTTP/WAP request | Assigned subscriber identity card |
|---|---|
| HTML/WAP file (.htm, .html, .wml, .asp, etc.) | Card A |
| video stream file (.avi, .mpg, .asf, .dat, etc.) | Card A |
| executable program file (.exe, .com, etc.) | Card A |
| image file (.bmp, .gif, .jpg, etc.) | Card B |
| audio stream file (.aac, .mp3, .rm, etc.) | Card B |
| data file (.doc, .xls, .ppt, .pdf, etc.) | Card B |

FIG. 18

```
SETUP rtsp://192.168.186.122:8554/demo.3gp/trackID=65637 RTSP/1.0
Transport: RTP/AVP;unicast;client_port=29796-29797;mode=play
Session: ismyiaz1e4mQ3
    . . .

PLAY rtsp://192.168.186.122:8554/demo.3gp RTSP/1.0
Range: npt=0-
Session: ismyiaz1e4mQ3
    . . .

PAUSE rtsp://192.168.186.122:8554/demo.3gp RTSP/1.0
Session: ismyiaz1e4mQ3
    . . .
```

FIG. 21

```
<smil>
<head>
<layout>
<region id="r1" top="15" left="20" width="100" height="50"/>
<region id="r2" top="15" left="140" width="100" height="50"/>
<region id="r3" top="80" left="20" width="100" height="50"/>
<region id="r4" top="80" left="140" width="100" height="50"/>
</layout>
</head>
<body>
<video region="r1" src="rtsp://server/video/v1.3gpp" />
<video region="r2" src="rtsp://server/video/v2.3gpp" />
<video region="r3" src="rtsp://server/video/v3.3gpp" />
<video region="r4" src="rtsp://server/video/v4.3gpp" />
</body>
</smil>
```

FIG. 23

METHODS FOR HANDLING PACKET-SWITCHED DATA TRANSMISSIONS BY MOBILE STATION WITH SUBSCRIBER IDENTITY CARDS AND SYSTEMS UTILIZING THE SAME

CROSS REFERENCE TO RELATED APPLICATIONS

This application is a Continuation of co-pending application Ser. No. 12/416,300, filed on Apr. 1, 2009, which claims the benefit of U.S. Provisional Application No. 61/085,469, filed on Aug. 1, 2008, the entirety of which is incorporated by reference herein.

BACKGROUND OF THE INVENTION

1. Field of the Invention

The invention relates to a method for handling packet-switched data transmissions by a mobile station, and more particularly to a method for handling packet-switched data transmissions by a mobile station with multiple subscriber identity cards.

2. Description of the Related Art

Currently, the Global System for Mobile communication (GSM) standard is the popular standard for mobile phones in the world. The GSM standard, standardized by the European Telecommunication Standards Institute (ETSI) is a cellular network structure and a Time Division Multiple Access (TDMA) system. For a carrier frequency, the TDMA system will divide a frame into eight time slots, wherein each time slot is used to transmit a channel data for a subscriber. Meanwhile, the General Packet Radio Service (GPRS) technology is one of the available technologies of a GSM system. The GPRS technology utilizes the unused channels in the GSM system to provide moderate speed data transmissions. The Wideband Code Division Multiple Access (W-CDMA) is a wideband spread-spectrum mobile air interface that utilizes the direct-sequence spread spectrum method of asynchronous code division multiple access to achieve higher speeds and support more users compared to the implementation of time division multiplexing (TDMA) used by GSM systems. Time Division-Synchronous Code Division Multiple Access (TD-SCDMA) is another type of 3G mobile telecommunications standard.

A dual SIM mobile phone is a phone with two Subscriber Identity Modules (SIMs), which correspond to different telephone numbers. The dual SIM mobile phone allows a user to use two communication services without carrying two phones at the same time. For example, the same mobile phone may be used for business and private use with separate numbers and bills, thus providing convenience to mobile phone users.

BRIEF SUMMARY OF THE INVENTION

Methods for handling packet-switched data transmissions by a mobile station with a first subscriber identity card and a second subscriber identity card and the systems utilizing the same are provided. An exemplary embodiment of a method for handling packet-switched data transmissions by a mobile station with a first subscriber identity card coupled to a first radio frequency (RF) module and a second subscriber identity card coupled to a second RF module, executed by an adapter of the mobile station, is provided. An uplink Internet protocol (IP) packet is received. Information regarding at least one of the received packet and hardware status of the mobile station is collected. One subscriber identity card is determined from the first and second subscriber identity cards according to the collected information. The received packet is transmitted to an IP network via the RF module corresponding to the determined subscriber identity card.

Furthermore, another exemplary embodiment of a method for handling packet-switched data transmissions by a mobile station with a first subscriber identity card coupled to a first radio frequency (RF) module and a second subscriber identity card coupled to a second RF module, performed by an application of the mobile station or a computer host, is provided. A plurality of requests each encapsulated in one or more uplink Internet Protocol (IP) packets are clustered into a first group and a second group. A first IP address corresponding to the first subscriber identity card is set as a source address of each IP packet of the first group. A second IP address corresponding to the second subscriber identity card is set as a source address of each IP packet of the second group. The uplink IP packets are transmitted to an adaptor responsible for transforming IP packets into a plurality of blocks and directing the first RF module and the second RF module to transmit the transformed blocks.

Moreover, an exemplary embodiment of a system for handling packet-switched data transmissions is provided. The system comprises a first RF module, a second RF module, a first subscriber identity card camping on a cell via the first RF module, a second subscriber identity card camping on the same cell or a different cell via the second RF module and a circuit. The circuit receives an uplink IP packet. The circuit collects information regarding the received packet and a specific assignment. The circuit determines one subscriber identity card from the first and second subscriber identity cards according to the collected information. The circuit transmits the received packet to an IP network via the RF module corresponding to the determined subscriber identity card.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 12 shows an exemplary assignment table illustrating the mappings between port numbers, service types and served Cards;

FIG. 15 shows an exemplary assignment table illustrating the mappings between original source addresses, modified source addresses, destination port numbers, service types and served subscriber identity cards;

FIG. 17 shows an exemplary assignment table illustrating the mappings between source addresses, destination addresses, source ports, destination ports, protocols and served subscriber identity cards;

FIG. 18 shows an exemplary assignment table illustrating the mappings between file types of HyperText Transfer Protocol/Wireless Application Protocol (HTTP/WAP) requests and served subscriber identity cards;

FIG. 21 shows an exemplary Session Description Protocol (SDP) document;

FIG. 23 shows an exemplary Synchronized Multimedia Integration Language (SMIL) document;

DETAILED DESCRIPTION OF THE INVENTION

Figure 1:
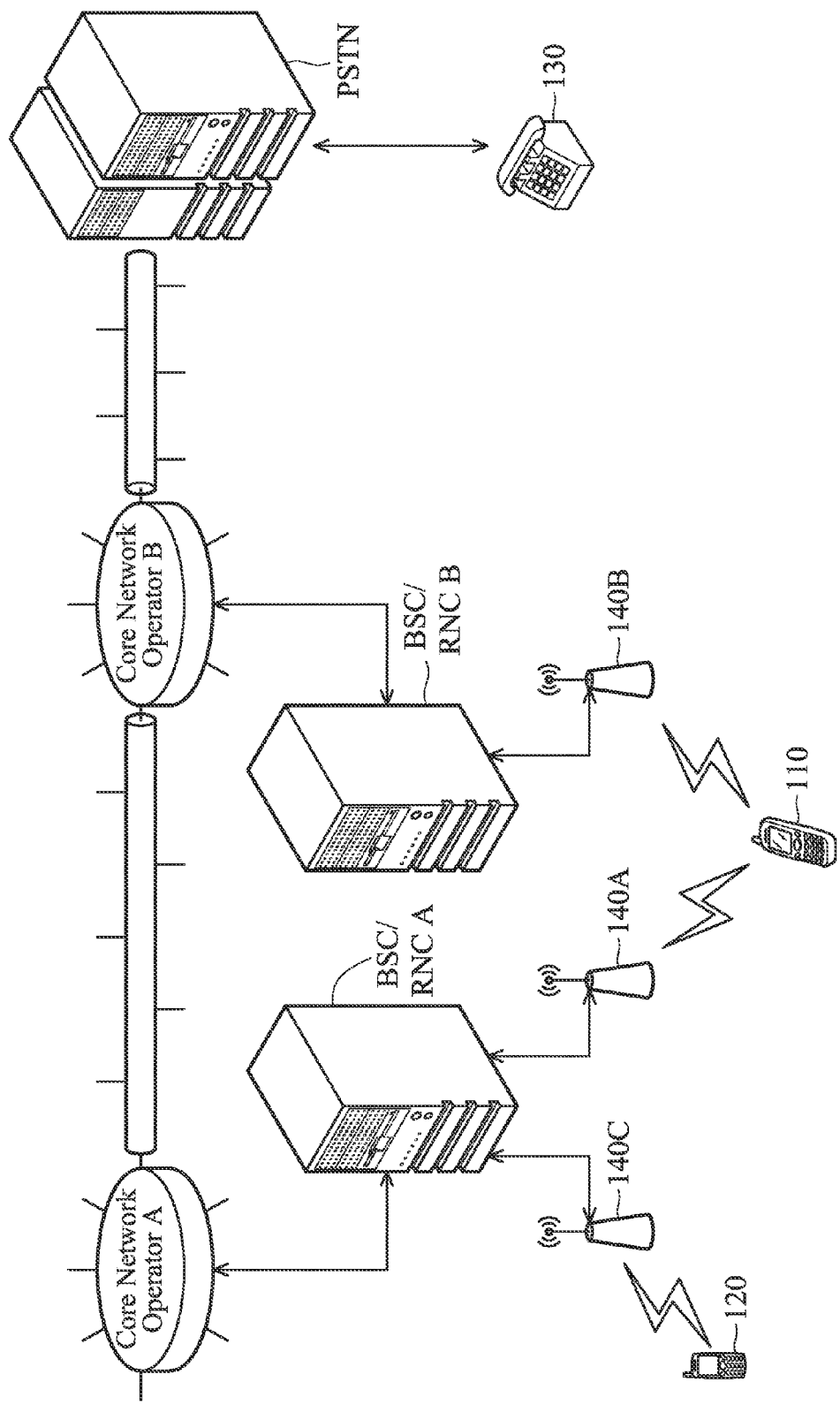
FIG. 1 shows a schematic diagram of a mobile communication network system.

The following description is of the best-contemplated mode of carrying out the invention. This description is made for the purpose of illustrating the general principles of the invention and should not be taken in a limiting sense. The scope of the invention is best determined by reference to the appended claims.

A subscriber identity module (SIM) card typically contains user account information, an international mobile subscriber identity (IMSI) and a set of SIM application toolkit (SAT) commands and provides storage space for phone book contacts. A micro-processing unit (MCU) of the Baseband chip (simply referred to as a Baseband MCU hereinafter) may interact with MCUs of the SIM cards (each simply referred to as a SIM MCU hereinafter) to fetch data or SAT commands from the plugged in SIM cards. A mobile station (MS) is immediately programmed after plugging in the SIM card. SIM cards may also be programmed to display custom menus for personalized services.

A universal SIM (USIM) card is inserted into a mobile station for Wideband Code Division Multiple Access (W-CDMA) or Time Division-Synchronous Code Division Multiple Access (TD-SCDMA) system (also called 3G) telephony communication. The USIM card stores user account information, an IMSI, authentication information and a set of USIM Application Toolkit (USAT) commands and provides storage space for text messages and phone book contacts. A Baseband MCU may interact with an MCU of the USIM card (each simply referred to as a USIM MCU hereinafter) to fetch data or SAT commands from the plugged in USIM cards. The phone book on the USIM card is greatly enhanced when compared to the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in the UMTS. A mobile station is immediately programmed after plugging in the USIM card.

A removable User Identity Module (R-UIM) or a Code Division Multiple Access (CDMA) Subscriber Identity Module (CSIM) card has already been developed for a CDMA mobile station and is equivalent to the GSM SIM and 3G USIM except that it is capable of working in CDMA networks. The R-UIM or the CSIM card is physically compatible with the GSM SIM card, and provides similar security mechanisms for the CDMA system.

The International Mobile Subscriber Identity (IMSI) is a unique number associated with a global system for mobile communication (GSM) or a universal mobile telecommunications system (UMTS) network user. The IMSI may be sent by a mobile station to a GSM or UMTS network to acquire other details of the mobile user in the Home Location Register (HLR) or as locally copied in the Visitor Location Register (VLR). An IMSI is typically 15 digits long, but may be shorter (for example MTN South Africa's IMSIs are 14 digits). The first 3 digits are the Mobile Country Code (MCC), and they are followed by the Mobile Network Code (MNC), which is either 2 digits (European standard) or 3 digits (North American standard). The remaining digits are the mobile subscriber identification number (MSIN) for a GSM or UMTS network user.

FIG. 1 shows a schematic diagram of a mobile communication network system. In FIG. 1, a mobile station (may be called user equipment interchangeably) 110 with dual subscriber identity cards A and B may simultaneously access the same or different core networks such as Global System for Mobile Communications (GSM), Wideband Code Division Multiple Access (WCDMA), CDMA 2000 and Time Division-Synchronous Code Division Multiple Access (TD-SCDMA) network and the like after camping on two cells 140A and 140B (i.e. each may be a base station, a node-B or others). The subscriber identity card A or B may be a SIM, USIM, R-UIM or CSIM card. The mobile station 110 may make a voice or data call to a called party 120 or 130 through the GSM system with the Base Station Controller (BSC), WCDMA/CDMA2000/TD-SCDMA network with Radio Network Controller (RNC), Public Switched Telephone Network (PSTN) or any combinations thereof using either the subscriber identity cards A or B. For example, the mobile station 110 may make a voice call with the subscriber identity card A to the called party 120 through the cell 140A, an BSC/RNC A and a cell 140C in sequence, or make a voice call with the subscriber identity card B to the called party 120 through the cell 140B, an BSC/RNC B, a core network operator B, a core network operator A, the BSC/RNC A and the cell 140C in sequence. Moreover, the mobile station 110 may receive a phone call request with either of the subscriber identity cards A or B from the calling party 120 or 130. For example, the mobile station 110 may receive a phone call request to the subscriber identity card B from the calling party 130 via a Public Switched Telephone Network (PSTN), the core network operator B, the BSC/RNC B and the cell 140B.

Figure 2:
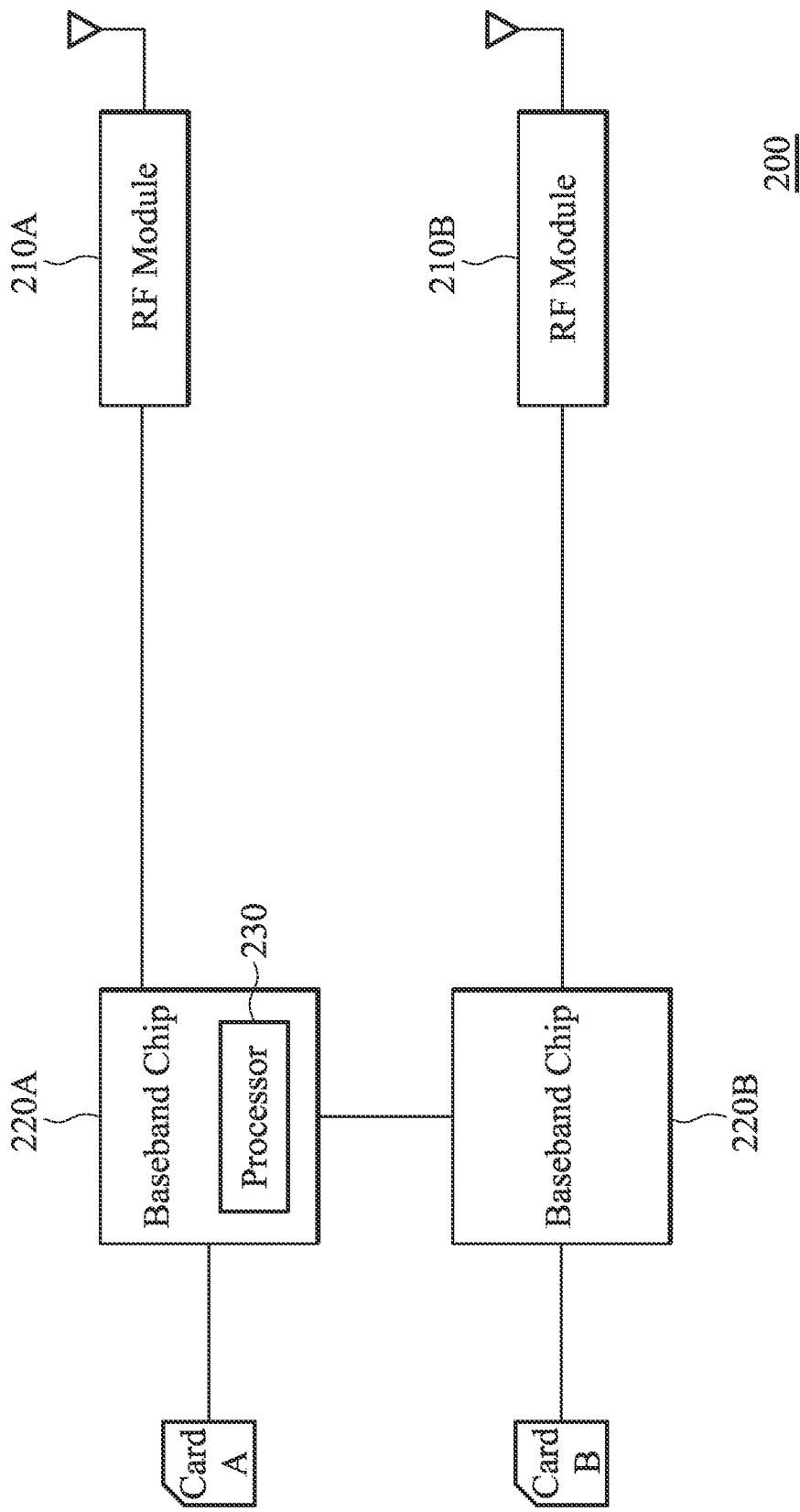
FIG. 2 shows a mobile station according to an embodiment of the invention.

FIG. 2 shows the hardware architecture of a mobile station 200 according to an embodiment of the invention. The mobile station 200 comprises two radio frequency (RF) modules 210A and 210B and two Baseband chips 220A and 220B, wherein the RF module 210A is coupled to the Baseband chip 220A and the RF module 210B is coupled to the Baseband chip 220B. Two subscriber identity cards A and B may be plugged into two sockets of the mobile station 200 connecting to the Baseband chips 220A and 220B respectively, wherein the subscriber identity cards A and B separately uses the RF Modules 210A and 210B to transmit signals to or receive signals from their camped on cell or neighboring cells. Each of the subscriber identity cards A and B may be a SIM, USIM, R-UIM or CSIM card, which is provided by a particular network operator. The mobile station 200 can therefore simultaneously camp on two cells provided by either the same network operator or different network operators for the plugged cards A and B and operate in stand-by/idle modes, or even dedicated modes, using different RF modules and Baseband chips. Each of the Baseband chips 220A and 220B may read data from a particular subscriber identity card A or B and write data to the subscriber identity card A or B. Furthermore, the Baseband chip 220A may be a master device for the mobile station 200, and comprises a processor 230 for controlling the communications between the subscriber identity cards A and B and the RF modules 210A and 210B. A further processor (not shown) may be provided in the Baseband chip 220B to coordinately operate with the processor 230 of the Baseband chip 220A to improve performance.

An RF module (e.g. 210A or 210B of FIG. 2) receives wireless radio frequency signals and converts the received signals to baseband signals to be processed by a corresponding Baseband chip (e.g. 220A or 220B of FIG. 2), or receives baseband signals from the Baseband chip and converts the received signals to wireless radio frequency signals to be transmitted to a peer device. The RF module may comprise a plurality of hardware devices to perform radio frequency conversion. For example, the RF module may comprise a mixer to multiply the baseband signals with a carrier oscillated in the radio frequency of the wireless communication system, wherein the radio frequency may be, for example, 900 MHz or 1800 MHz for global system for mobile communication (GSM), or 1900 MHz or 2100 MHz for Universal Mobile Telecommunications System (UMTS). The Baseband chip further converts the baseband signals to a plurality of digital signals, and processes the digital signals, and vice versa. The Baseband chip may also comprise a plurality of hardware devices to perform baseband signal processing. The baseband signal processing may comprise analog to digital conversion (ADC), digital to analog conversion (DAC), gain adjustments, modulation/demodulation, encoding/decoding, and so on.

In GSM, one inserted subscriber identity cards of mobile station as shown in FIG. 2 can be operated in idle mode and dedicated mode. Referring to FIG. 1, in idle mode, the mobile station 110 is either searches for or measures the Broadcast Control Channel (BCCH) with better signal quality from a base station (e.g. the cell 140A or 140B) provided by a specific network operator, or is synchronized to the BCCH of a specific base station to be ready to perform a random access procedure on the Random Access Channel (RACH) to request a dedicated channel. In dedicated mode, the mobile station 110 occupies a physical channel and tries to synchronize therewith, and establishes logical channels and switches throughout them.

Specifically, in GSM, for each inserted subscriber identity card in idle mode, the mobile station 110 continuously listens to the BCCH from a base station and reads the BCCH information and conducts periodic measurements of the signaling strength of the BCCH carriers in order to select a suitable cell to be camped on. In idle mode, no exchange of signaling messages is presented with the network. The data required for Radio Resource Management (RR) and other signaling procedures is collected and stored, such as the list of neighboring BCCH carriers, thresholds for RR algorithms, Common Control Channel (CCCH) configurations, information regarding the use of RACH and Paging channel (PCH), or others. Such kind of information (e.g. system information (SI)) is broadcasted by a base station system on the BCCH and provides information about the network configuration. Moreover, the SI is available for all mobile stations currently in the cell. The SI comprises a Public Land Mobile Network (PLMN) code uniquely owned by a network operator. The PLMN code comprising a Mobile Country Code (MCC) and a Mobile Network Code (MNC), indicating which network operator is providing the communication services. In addition, a cell identity (ID) indicating which cell is broadcasting the BCCH is also contained in the SI. Furthermore, the SI may comprise network identification, neighboring cells, channel availability and power control requirements etc. The PLMN code may be acquired and stored in a corresponding subscriber identity card of the electronic device upon receiving the SI from the BCCH. The Base Station System (BSS) further continuously sends out, on all PCHs of a cell valid Layer 3, messages (PAGING REQUEST) which the mobile station 110 can decode and recognize if its address (e.g. its IMSI of a specific SIM card) is paged. The mobile station 110 periodical monitors the PCHs to avoid loss of paging calls.

Each exchange of signaling messages with the network, e.g. BSS, Mobile Switching Center (MSC) and the similar, requires a Radio Resource Management (RR) connection and the establishment of an LAPDm connection between a mobile station and BSS. Setting up the RR connection can be initiated by the mobile station or network. In either situation, the mobile station sends a channel request (CHAN-QUEST) on the RACH in order to get a channel assigned on the Access Grant Channel (AGCH), also referred to as an immediate assignment procedure. The channel request may be rejected by an immediate assignment reject procedure. If the network does not immediately answer to the channel request, the request is repeated for a certain number of times. In the situation of a network-initiated connection, a procedure is preceded by a paging call (PAGING REQUEST) to be answered by the mobile station (PAGING RESPONSE). After an RR connection has been successfully completed, higher protocol layers, Connection Management (CM) and Mobility Management (MM) can receive and transmit signaling messages.

In contrast to the setup of connections, the release of connections is typically initiated by the network (CHANNEL RELEASE). The release of connections may occur when the signaling transaction ends, there are too many errors, or the channel is removed due to a higher priority call, e.g. an emergency call, or end of a call.

Once an RR connection has been set up, the mobile station has either a Stand-alone Dedicated Control Channel (SDCCH) or a Traffic Channel (TCH) with associated Slow/Fast Associated Control Channel (SACCH/FACCH) available for exclusive bidirectional use.

Setting up an MM connection from the mobile station presumes the existence of an RR connection, but a single RR connection can be used by multiple MM connections. If the MM connection can be established, the mobile station sends the message CM-SERVICE REQUEST to the network. The message CM-SERVICE REQUEST contains information regarding a mobile subscriber (IMSI or Temporary Mobile Subscriber Identity (TMSI)), where a TMSI has only local significance within a Location Area and must be used together with the Location Area Identity (LAI) for the unique identification of a subscriber, as well as information regarding the requested service (outgoing voice call, short message service SMS transfer, activation or registration of a supplementary service, or others). If the mobile station receives the message CM-SERVICE ACCEPT or local message from the RR sub-layer that enciphering has been activated, it is treated as an acceptance of the service request, and the requesting CM entity is informed about the successful setup of an MM connection. Otherwise, if the service request has been rejected by the network, the mobile station receives a message CM-SERVICE REJECT, and the MM connection cannot be established.

In W-CDMA or TD-SCDMA, one inserted subscriber identity card of mobile station as shown in FIG. 2 can be operated in idle mode and connected mode. Referring to FIG. 1, in idle mode, the mobile station selects (either automatically or manually) a PLMN to contact. The mobile station continuously listens to the BCCH to acquire an SI comprising a PLMN code uniquely owned by a network operator. The PLMN code comprising an MCC and an MNC indicates which network operator is providing communication services. In addition, an ID indicating which cell is broadcasting the BCCH is also contained in the SI. The PLMN code may be acquired and stored in a corresponding subscriber identity card of the electronic device upon receiving the SI from the BCCH. The mobile station searches for a suitable cell of the chosen PLMN, chooses that cell to provide available services, and tunes to its control channel, also referred to as "camping on a cell". After camping on a cell in idle mode, the mobile station can receive system information and cell broadcast messages from a node-B (e.g. the cell 140A or 140B). The mobile station stays in idle mode until the node-B transmits a request to establish a Radio Resource Control (RRC) connection. In idle mode, the mobile station is identified by non-access stratum identities such as IMSI, TMSI and Packet-TMSI (P-TMSI).

In the Cell_DCH state of connected mode, a dedicated physical channel is allocated to the mobile station, and the mobile station is known by its serving radio network controller (RNC) on a cell or active set level. The mobile station performs measurements and sends measurement reports according to measurement control information received from RNC. The mobile station with certain capabilities monitors the Forward Access Channel (FACH) for system information messages. In the Cell_FACH state of connected mode, no dedicated physical channel is allocated for the mobile station, but a Random Access Channel (RACH) and FACH are used instead, for transmitting both signaling messages and small amounts of user plane data. In this state, the mobile station also listens to the Broadcast Channel (BCH) to acquire system information. The mobile station performs cell reselections, and after a reselection the mobile station typically sends a Cell Update message to the RNC, so that the RNC knows the mobile station location on a cell level. In the Cell_PCH state of a connected mode, the mobile station is known on a cell level in a Serving Radio Network Controller (SRNC), but the mobile station can be reached only via the Paging Channel (PCH). The URA_PCH state of a connected mode is very similar to the Cell_PCH state, except that the mobile station does not execute Cell Update after each cell reselection procedure, but instead reads the UMTS Terrestrial Radio Access Network (UTRAN) Registration Area (URA) identities from the BCH, and only if the URA changes (after cell reselection) does the mobile station inform its location to the SRNC. The mobile station leaves the connected mode and returns to the idle mode when the RRC connection is released or following RRC connection failure.

The establishment of an RRC connection and Signaling Radio Bearers (SRB) between a mobile station and UTRAN (RNC) is initiated by a request from higher layers (non-access stratum) on the mobile station side. In a network-originated case, the establishment is preceded by an RRC Paging message. The UTRAN (RNC) may respond with an RRC Connection Set-up message including a dedicated physical channel assignment for the mobile station (move to the Cell-FACH state), or a command to instruct the mobile station to use common channels (move to the Cell_FACH state).

General Packet Radio Service (GPRS) has been developed in GSM/WCDMA/TD-SCDMA networks. GPRS provides wireless access to packet data networks. Networks based on the Internet Protocol (IP) (e.g. the global Internet or private/corporate intranets) and X.25 networks are supported. Before one of the subscriber identity cards A and B of a mobile station can use the GPRS service, the card of the mobile station attaches to the GPRS network. An ATTACH REQUEST message of the mobile station is sent to a Serving GPRS Support Node (SGSN). The GPRS network then checks if the mobile station is authorized, copies the user profile from the Home Location Register (HLR) to the SGSN, and assigns a Packet Temporary Mobile Subscriber Identity (P-TMSI) to the mobile station. The described procedure is called GPRS Attach.

Figure 3:
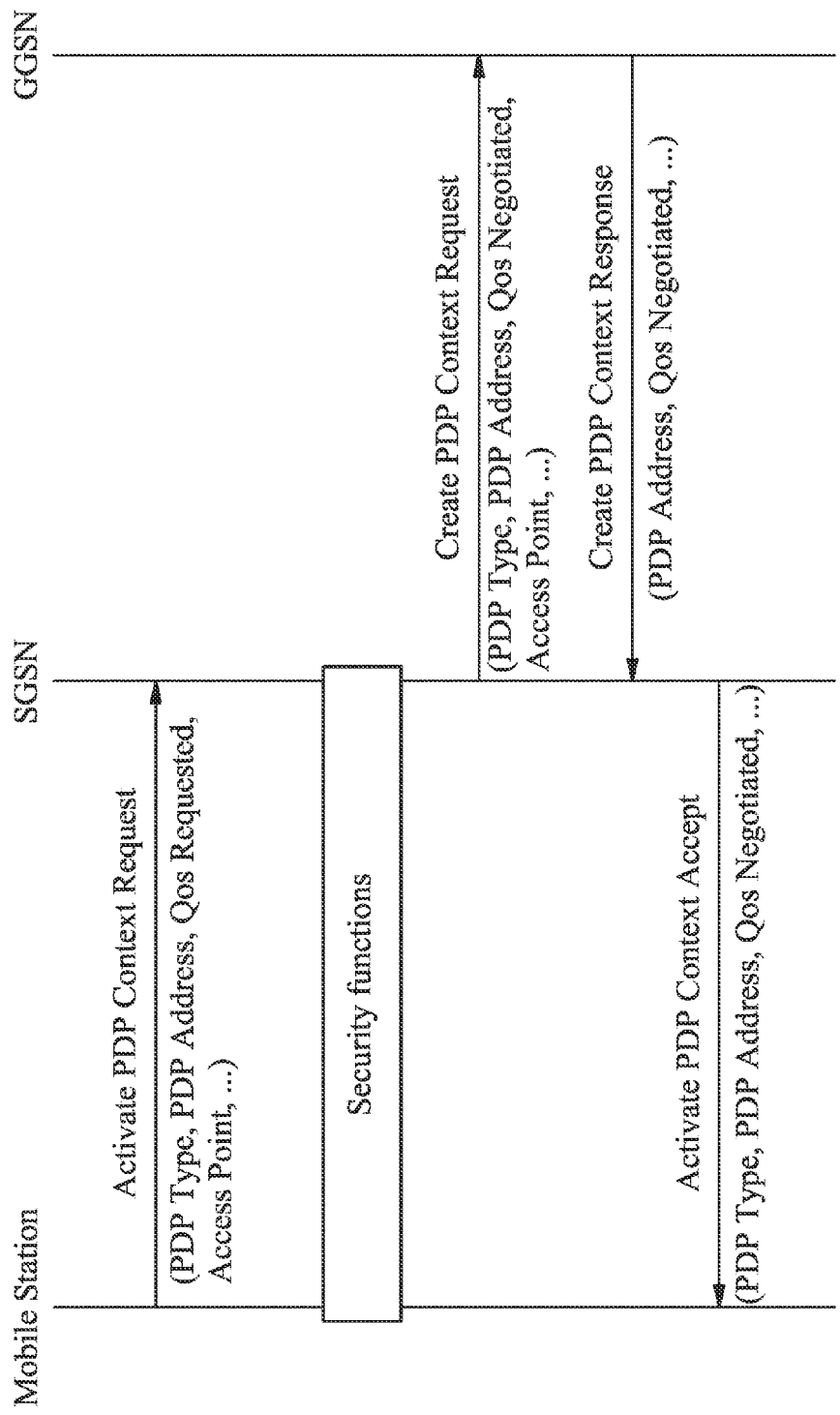
FIG. 3 shows the Packet Data Protocol (PDP) context activation procedure initialized by the mobile station.

To exchange data packets with external Public Data Networks (PDNs) after a successful GPRS Attach, a mobile station applies for an address used in the PDN. The address is called a Packet Data Protocol (PDP) address. In the case where the PDN is an IP network, the PDP address is an IP address. For each session, a so-called PDP context is created, which describes the characteristics of the session. The PDP context describes the PDP type (e.g. IPv4, IPv6 or others), the PDP address assigned to the a mobile station, the requested Quality of Service (QoS) class and the address of a Gateway GPRS Support Node (GGSN) that serves as the access point to the external network. FIG. 3 shows the PDP context activation procedure initialized by the mobile station. Using the message ACTIVATE PDP CONTEXT REQUEST, the mobile station informs the SGSN of the requested PDP context. After that, the typical GSM/W-CDMA/TD-SCDMA security functions (e.g. authentication of the mobile station) are performed. If access is granted, the SGSN will send a CREATE PDP CONTEXT REQUEST to the affected GGSN. The GGSN creates a new entry in its PDP context table, which enables the GGSN to route data packets between the SGSN and the external PDN. The GGSN confirms the request to the SGSN with a message CREATE PDP CONTEXT RESPONSE. Finally, the SGSN updates its PDP context table and confirms the activation of the new PDP context to the mobile station (ACTIVATE PDP CONTEXT ACCEPT). For the mobile station using both circuit switched and packet switched services, it is possible to perform combined GPRS/IMSI attachment procedures. The disconnection from the GPRS network is called GPRS Detach. It can be initiated by the mobile station or by the GPRS network.

Internet Protocol (IP) packets are transmitted within the GPRS backbone network. The transmissions are achieved using the GPRS Tunneling Protocol (GTP), that is, GTP packets carry the user's IP packets. The GTP is defined both between the GPRS Supports Nodes (GSNs) within the same PLMN and between GSNs of different PLMNs. It contains procedures in the transmission plane as well as in the signaling plane. In the transmission plane, the GTP employs a tunnel mechanism to transfer user data packets. In the signaling plane, the GTP specifies a tunnel control and management protocol. The signaling is used to create, modify, and delete tunnels. A Tunnel Identifier (TID), which is composed of the IMSI of the subscriber identity card A or B and a Network Layer Service Access Point Identifier (NSAPI) uniquely indicates a PDP context. Below the GTP, the transmission control protocol (TCP) or the user datagram protocol (UDP) is employed to transport the GTP packets within the backbone network. In the network layer, the IP is employed to route the packets through the backbone.

Taking GSM system as an example, after one subscriber identity card of the mobile station successfully attaches to the GPRS network, a cell supporting the GPRS application may allocate physical channels for GPRS traffic. In other words, the radio resources of a cell are shared by the subscriber identity card of the mobile station.

Figure 4:
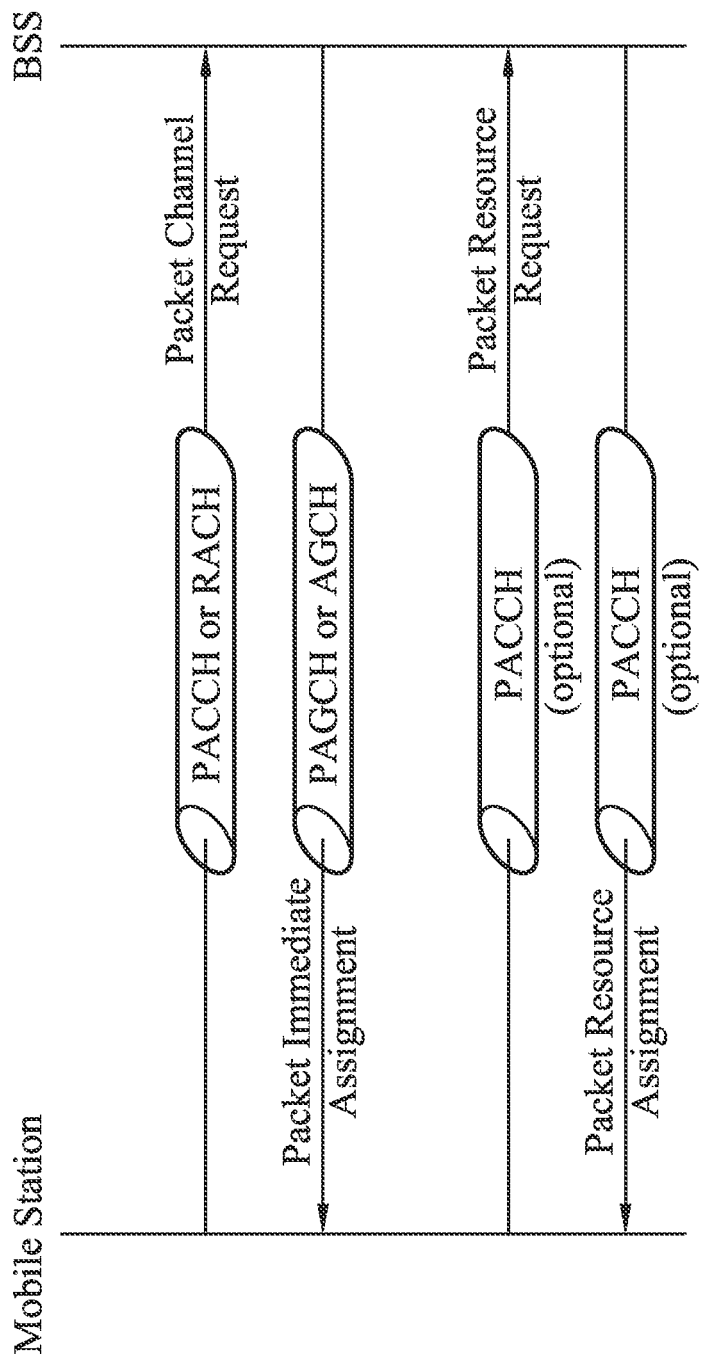
FIG. 4 shows uplink channel allocation (mobile originated packet transfer)

FIG. 4 shows an exemplary uplink channel allocation (mobile originated packet transfer). The attached subscriber identity card of the mobile station requests a channel by sending a PACKET CHANNEL REQUEST on the Packet Random Access Channel (PRACH) or RACH. The BSS answers on the Packet Access Grant Channel (PAGCH) or AGCH. Once the PACKET CHANNEL REQUEST is successful, a so-called Temporary Block Flow (TBF) is established. With that, resources (e.g. Packet Data Traffic Channel (PDTCH) and buffers) are allocated for the attached subscriber identity card of the mobile station, and data transmission can start. During transfer, the Uplink State Flag (USF) in the header of the downlink blocks indicates to other mobile stations that the uplink PDTCH is already in use. On the receiver side, a Temporary Flow Identifier (TFI) is used to reassemble the packet. Once all data has been transmitted, the TBF and the resources are released.

Figure 5:
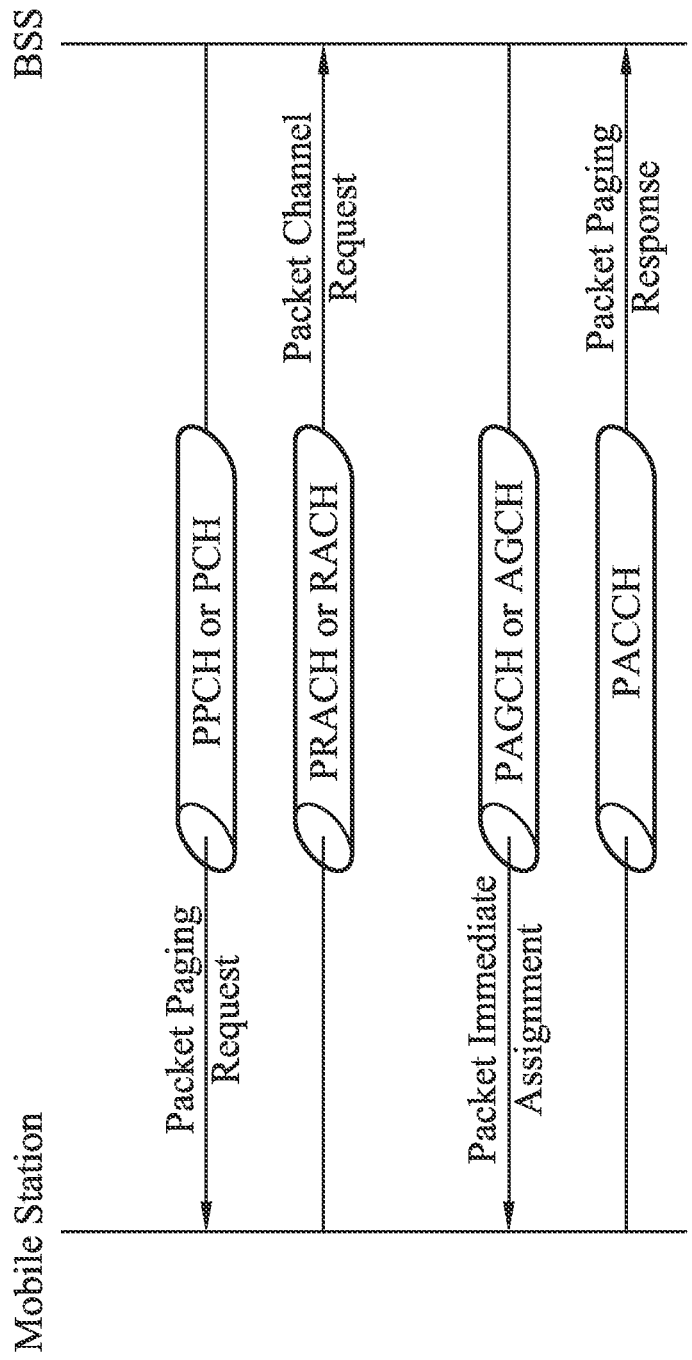
FIG. 5 shows an exemplary paging procedure for a subscriber identity card of a mobile station (mobile terminated packet transfer)

FIG. 5 shows an exemplary paging procedure for a subscriber identity card of a mobile station (mobile terminated packet transfer). The BSS pages the attached subscriber identity card of the mobile station by sending a PACKET PAGING REQUEST on the Packet Paging Channel (PPCH) or PCH. The attached subscriber identity card of the mobile station answers on the Packet Random Access Channel (PRACH) or RACH.

Figure 6:
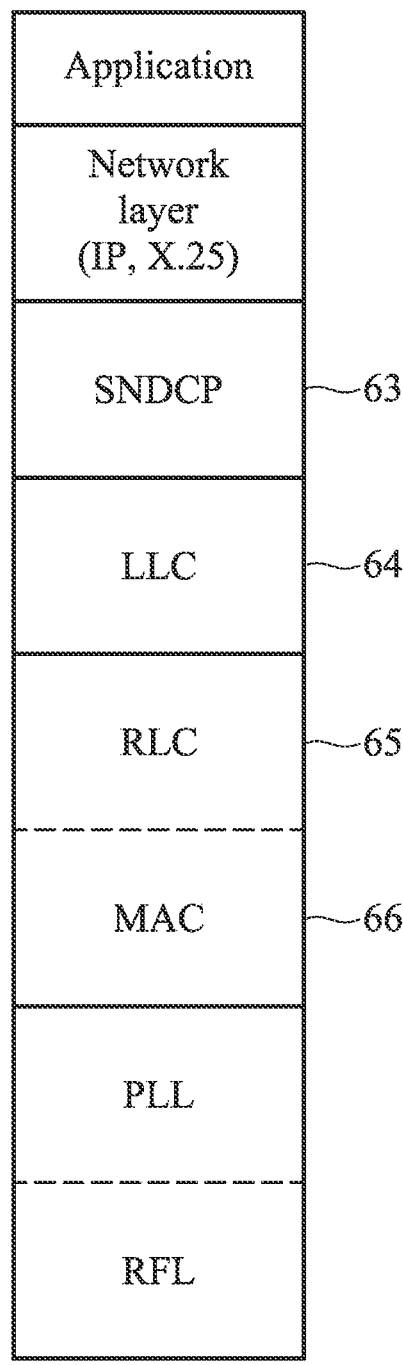
FIG. 6 shows an exemplary protocol architecture for the transmission plane of the GSM network, utilized by a mobile station with a subscriber identity card.

FIG. 6 shows an exemplary protocol architecture for the transmission plane of the GSM network, utilized by a mobile station with a subscriber identity card. The Subnetwork Dependent Convergence Protocol (SNDCP) layer 63 is used to transfer IP packets between the mobile station and its assigned SGSN. IP packets may contain at least HyperText Transfer Protocol (HTTP), Wireless Application Protocol (WAP), File Transfer Protocol (FTP), Simple Mail Transfer Protocol (SMTP), Post Office Protocol 3 (POP3) or Internet Mail Protocol (IMAP) messages, or others. HTTP is used to request and transmit files, especially Web pages and Web page components, over the Internet or other computer network. WAP is a standard for providing cellular phones, pagers and other handheld devices with secure access to e-mail and text-based Web pages. FTP is used to transfer files on the Internet between client computers and file servers, where files may be transferred, downloaded, and uploaded individually or in batch form. SMTP defines the message format and the message transfer agent (MTA), which stores and forwards e-mail messages. POP3 and IMAP are the two common mailbox access protocols used for Internet e-mail. POP3 is a standard interface between an e-mail client program and the mail server. POP3 provides a message store that holds incoming e-mail until users log in and download it. IMAP is an Internet standard for directly reading and manipulating e-mail messages stored on remote servers. The Logical Link Control (LLC) layer 64 provides a reliable logical link between the MS and its assigned SGSN. The purpose of the Radio Link Control (RLC) layer 65 is to establish a reliable link between the mobile station and the Base Station System (BSS). The operations of the RLC layer 65 include the segmentation and reassembly of the LLC frames into the RLC data blocks. The Medium Access Control (MAC) layer 66 controls the access attempts of the mobile station on the radio channel. The MAC layer 66 employs algorithms for contention resolution of access attempts, statistical multiplexing of channels and a scheduling and prioritizing scheme, which takes the negotiated QoS into account. The MAC protocol additionally allows that a single mobile station simultaneously uses several physical channels (i.e. several times slots of the same TDMA frame). It also controls the statistical multiplexing, that is, it controls how several mobile stations can access the same physical channel (the same time slot of successive TDMA frames).

Figure 7:
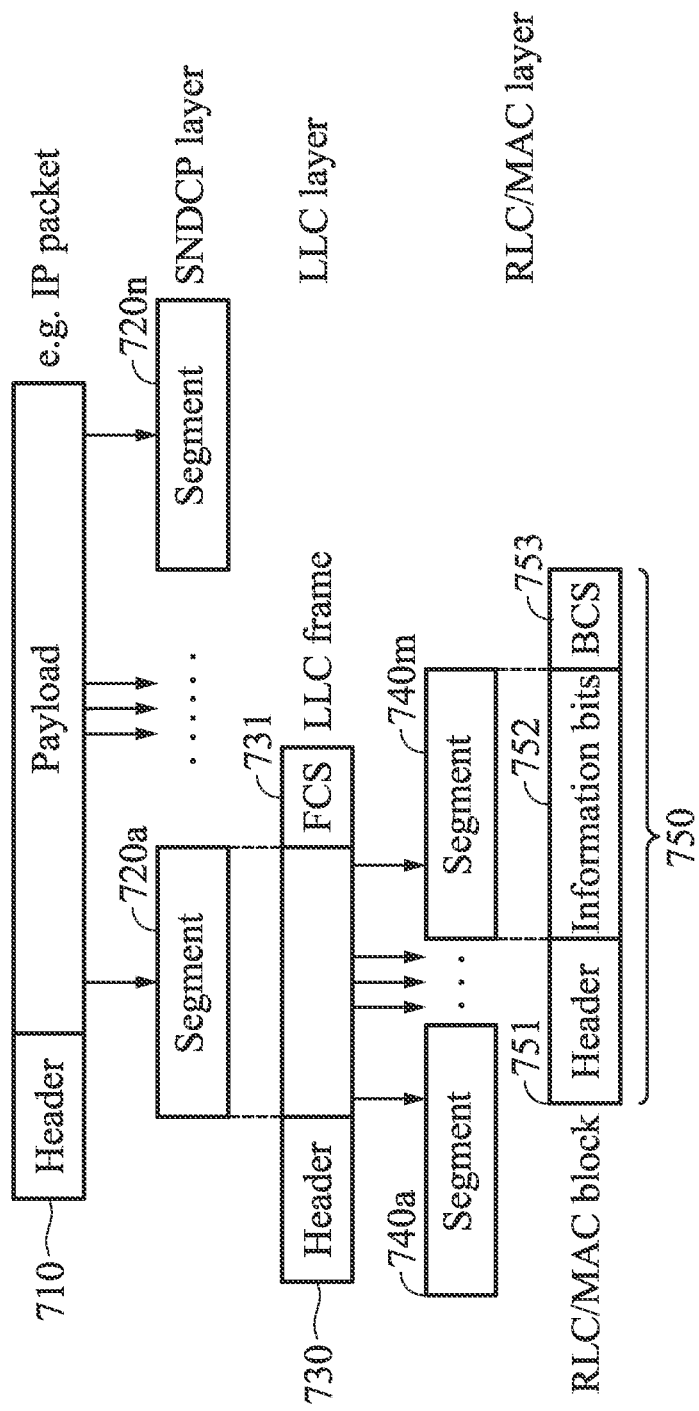
FIG. 7 shows data flow between the protocol layers shown in FIG. 6 in the mobile station.

FIG. 7 shows data flow between the protocol layers shown in FIG. 6 in the mobile station. At least one IP packet 710 is passed down to the SNDCP layer 63, where it is segmented to LLC data blocks 720a to 720n. After adding header information and a Frame Check Sequence (FCS) 731 for error protection, the LLC frames 730 are segmented into one or several RLC data blocks 740a to 740m, and then passed down to the MAC layer 66. Each RLC/MAC block 750 contains a MAC and RLC header 751, the RLC payload ("information bits") 752, and a Block Check Sequence (BCS) 753 at the end.

Figure 8:
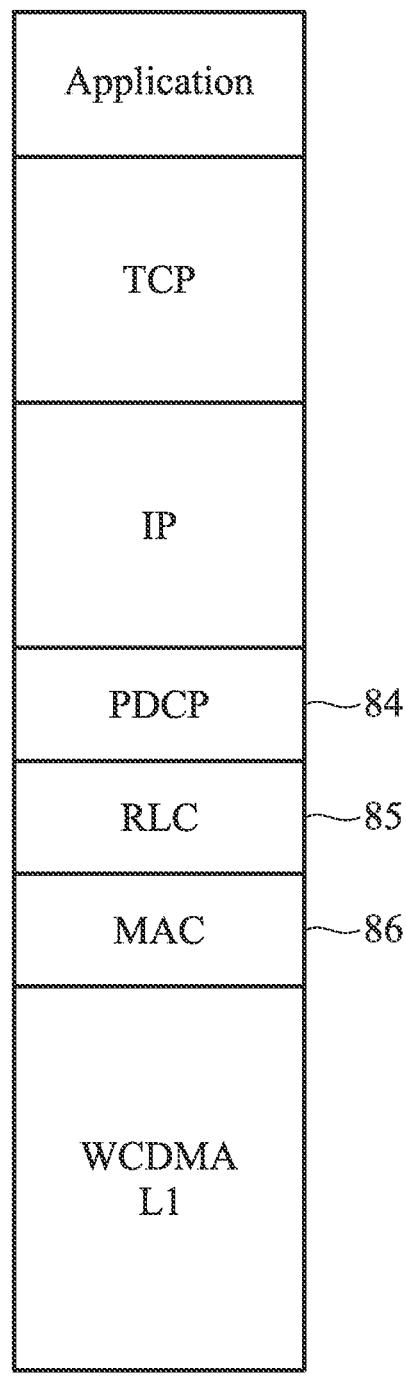
FIG. 8 shows an exemplary protocol architecture for the user plane of the WCDMA/TD-SCDMA network, utilized by a mobile station with a subscriber identity card.

FIG. 8 shows an exemplary protocol architecture for the user plane of the WCDMA/TD-SCDMA network, utilized by a mobile station with a subscriber identity card. The Medium Access Control (MAC) layer 86 offers services to the radio link control (RLC) layer 85 by means of logical channels. The logical channels are distinguished by types of data being transmitted. The RLC layer 85 offers services to higher layers via service access points (SAPs), which describe how the RLC layer 85 handles the data packets. On the user plane, the RLC services are used either by the service-specific protocol layers, Packet Data Convergence Protocol (PDCP) 84. The Packet Data Convergence Protocol (PDCP) is presented for the Packet Switching (PS) domain services. Main function of the PDCP is header compression.

Figure 9:
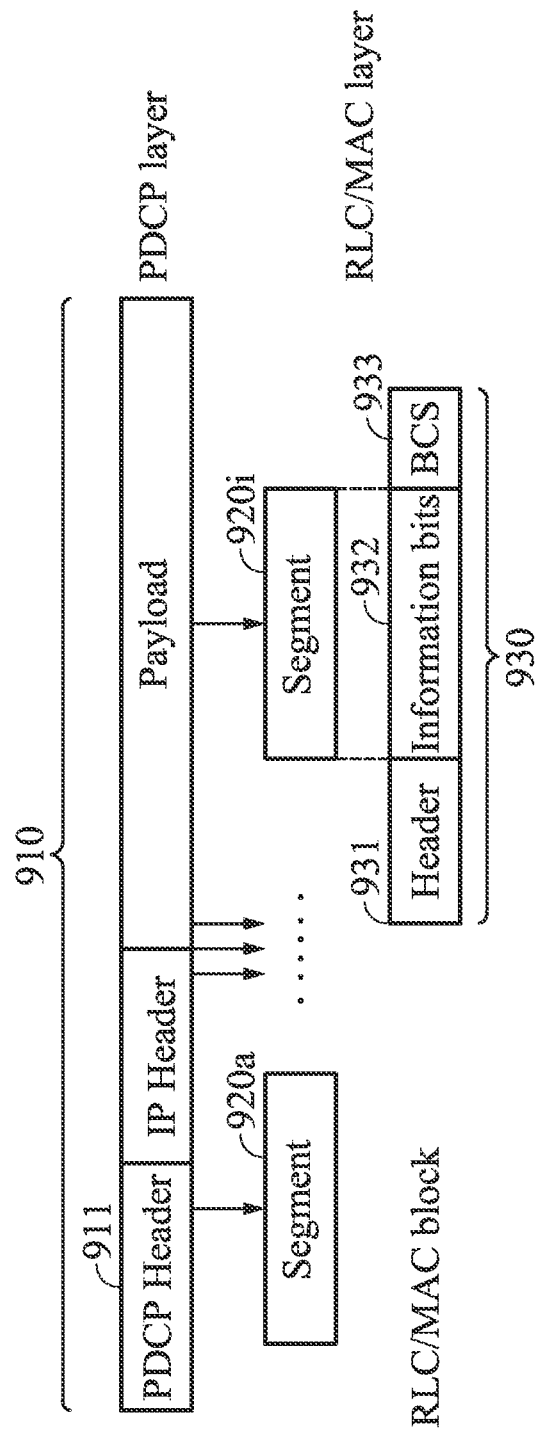
FIG. 9 shows data flow between the protocol layers shown in FIG. 8 in the mobile station.

FIG. 9 shows data flow between the protocol layers shown in FIG. 8 in the mobile station. IP packets are passed down to the PDCP layer 84 to add header information. IP packets may contain at least HTTP, WAP, FTP, SMTP, POP3 or IMAP messages, or others. After adding header information 911, the PDCP frames 910 are segmented into one or several RLC data blocks 920a to 920i, and then passed down to the MAC layer 86. Each RLC/MAC block 930 contains a MAC and RLC header 931, the RLC payload ("information bits") 932, and a Block Check Sequence (BCS) 933 at the end.

Figure 10A:
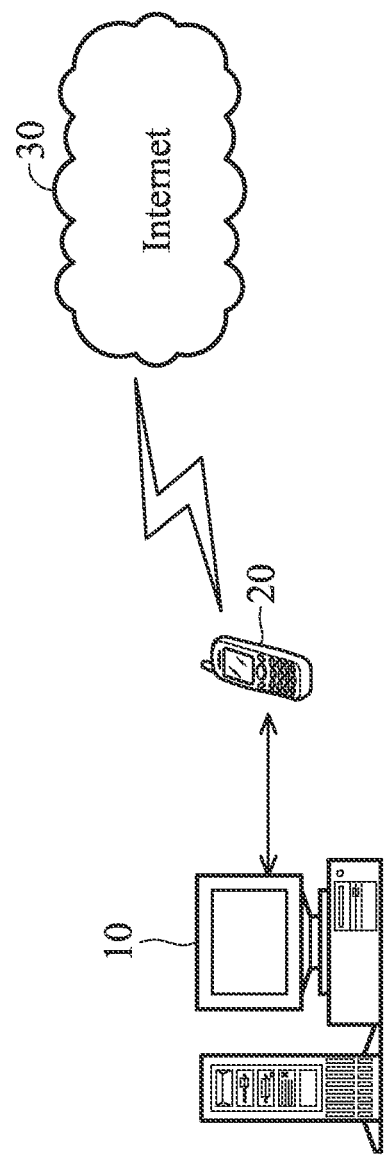
FIG. 10A shows a schematic diagram illustrating a computer host accessing the internet via a mobile station.
Figure 10B:
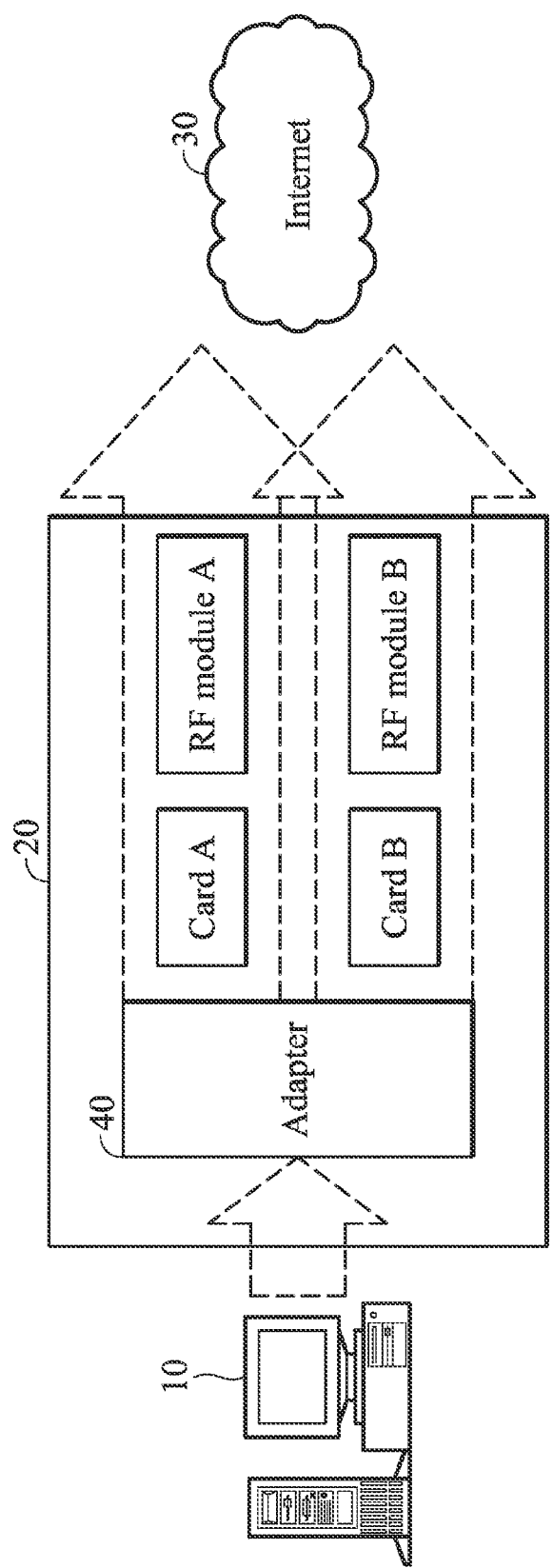
FIG. 10B shows an exemplary block diagram of the mobile station shown in FIG. 10A.

FIG. 10A shows a schematic diagram illustrating a computer host 10 attempting to access the Internet 30 via a mobile station 20, and FIG. 10B shows an exemplary block diagram of the mobile station 20. In FIG. 10A, the mobile station 20 is coupled to the computer host 10 through a wire/wireless connection, such as a Universal Serial Bus (USB), a bluetooth (BT) connection and so on. Referring to FIG. 10A, FIG. 10B and FIG. 2 together, with dual subscriber identity cards, denoted as the Card A and the Card B, each corresponding to a dedicated RF module, denoted as the RF module A or the RF module B, an adapter 40 is introduced in an embodiment of a system for handling packet-switched (PS) data transmissions with two or more subscriber identity cards. The adapter 40 may be implemented in software code to be executed by one or more micro control units (MCUs, e.g. 230 of FIG. 2), dedicated hardware circuits, or a combination thereof. Each MCU may be installed in one of the Baseband chips (e.g. 220A and 220B of FIG. 2) or outside of the Baseband chips. Before actual data transmission, the Card A and the Card B may register at the same or different wireless telecommunication networks, respectively, such as GSM, WCDMA, TD-SCDMA network and the like, and camp on the same or different cells governed by BSSs, node-Bs and the like. Moreover, the Card A and the Card B may obtain the IP addresses, namely IP(A) and IP(B), respectively after PDP Context Activation procedures as shown in FIG. 3. The computer host 10, such as computers, notebooks, portable electronic devices or others, or the mobile station 20 may have its own IP address, namely an IP(U), or may employ one of the IP(A) and IP(B) as its IP address for accessing the Internet resource 30.

Figure 11:
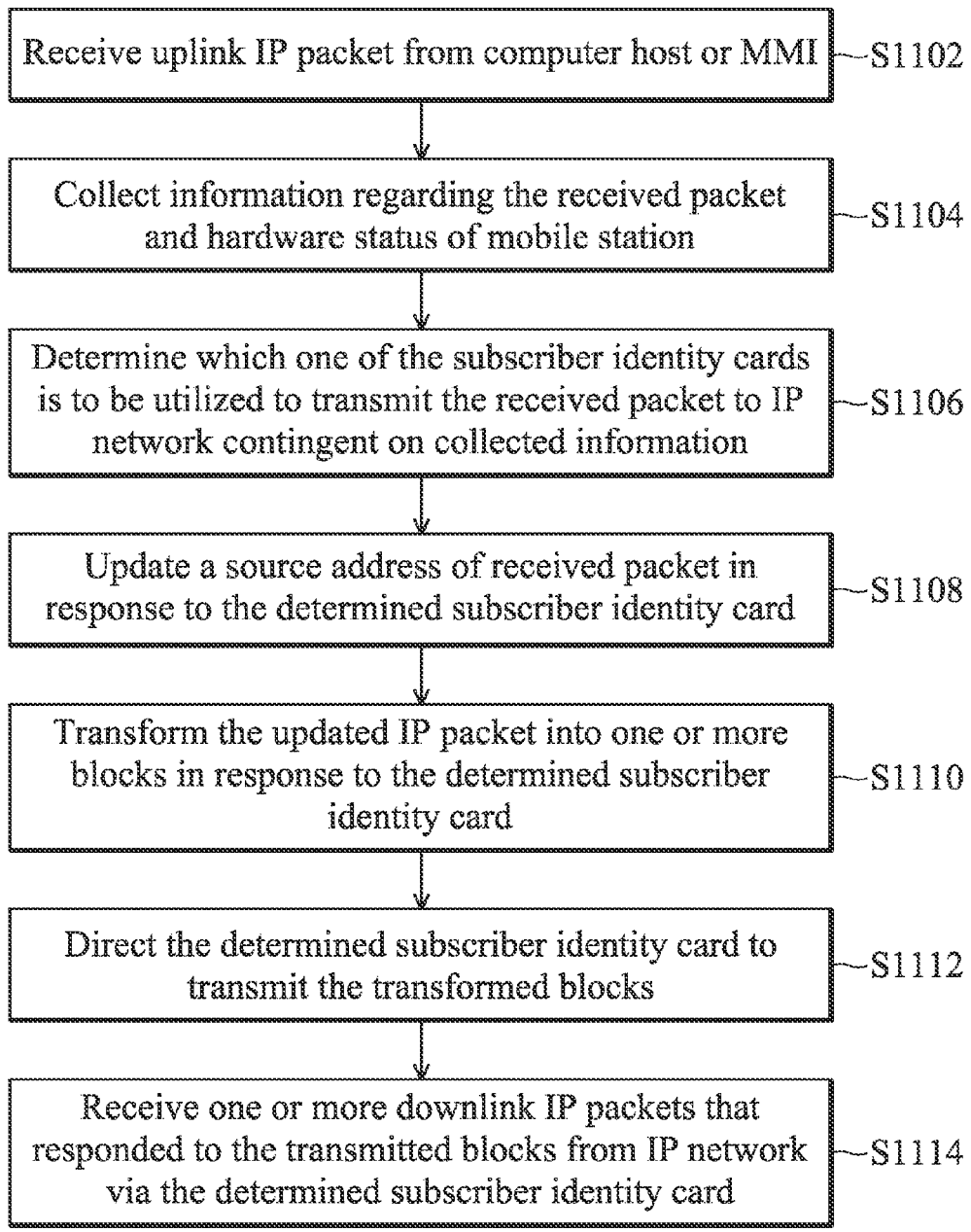
FIG. 11 shows a flow chart illustrating a method for handling packet-switched data transmissions according to an embodiment of the invention.

FIG. 11 shows a flow chart illustrating a method for handling packet-switched data transmissions according to an embodiment of the invention. Referring to FIG. 10B together with FIG. 11, when receiving an uplink IP packet from the computer host 10 or a man-machine interface (MMI) resident in the mobile station 20 (not shown) (step S1102), the adapter 40 is responsible for collecting information regarding packet and hardware statuses of the mobile station 20 (step S1104) and determining which subscriber identity card will be used to transmit the uplink IP packet according to collected information (step S1106). For example, the collected information may regard at least one of the content encapsulated in the uplink IP packet, transmission (Tx) buffer occupancy, and receiving (Rx) buffer occupancy, and which subscriber identity card is utilized to transmit the last uplink IP packet, and the like. Next, the adapter 40 updates a source address of the header of the uplink IP packet if required (step S1108). For example, when deciding that the uplink IP packet is going to be transmitted by the Card A, a source address of the header of the uplink IP packet is updated with the IP(A). Subsequently, the adapter 40 transforms the uplink IP packet into one or more blocks (step S1110) and directs the determined subscriber identity card and the RF module corresponding to the determined subscriber identity card to transmit the blocks to a destination via the corresponding camped on cell and registered wireless telecommunication network (step S1112). Details of transformation into one or more blocks may refer to descriptions of FIG. 7 or 9. Next, the adapter 40 may receive one or more downlink IP packets that responded to the transmitted blocks from the destination via the determined subscriber identity card (step S1114).

In some embodiments, pairs of subscriber identity cards and RF modules are pre-assigned to serve different types of services, respectively. For example, the Card A and the RF module A are utilized to serve FTP services, while the Card B and the RF module B are utilized to serve HTTP, SMTP, POP3, IMAP services. FIG. 12 shows an exemplary assignment table illustrating the mappings between port numbers, service types and served Cards, wherein the mappings are configurable. In addition, the mappings may be implemented in an array, a linked list, or others, and stored in a non-volatile/volatile memory device of the mobile station 20.

Figure 13A:
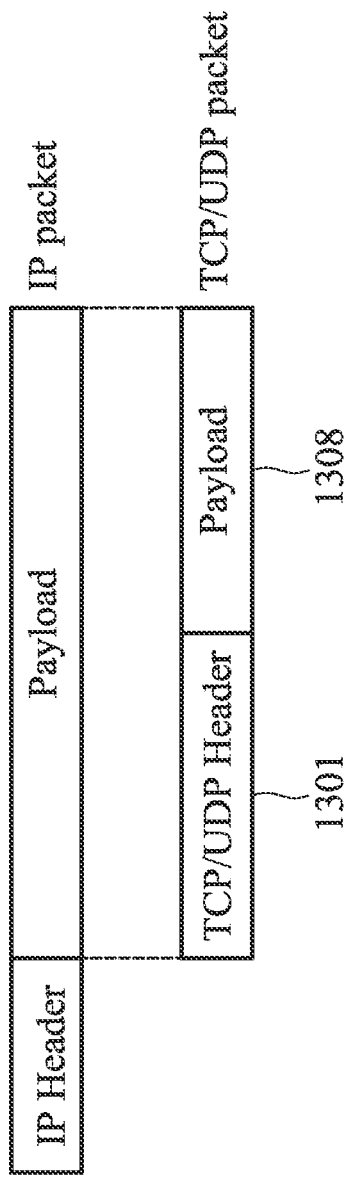
FIG. 13A shows data flow for an Internet Protocol (IP) packet which has a destination port number presented in the transmission control protocol/user datagram protocol (TCP/UDP) header.
Figure 13B:
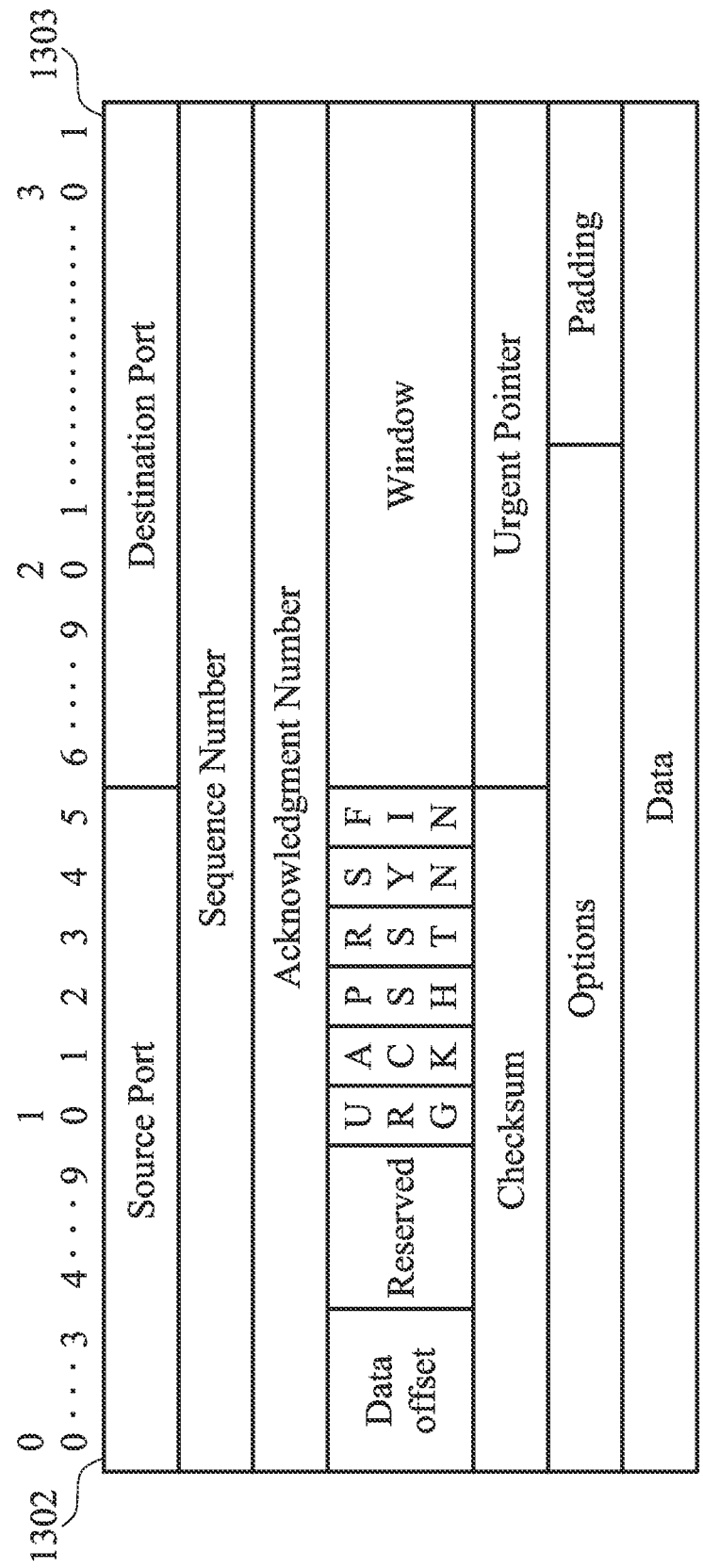
FIG. 13B shows a TCP Header and Payload Format of the IP packet shown in FIG. 13A.
Figure 13C:
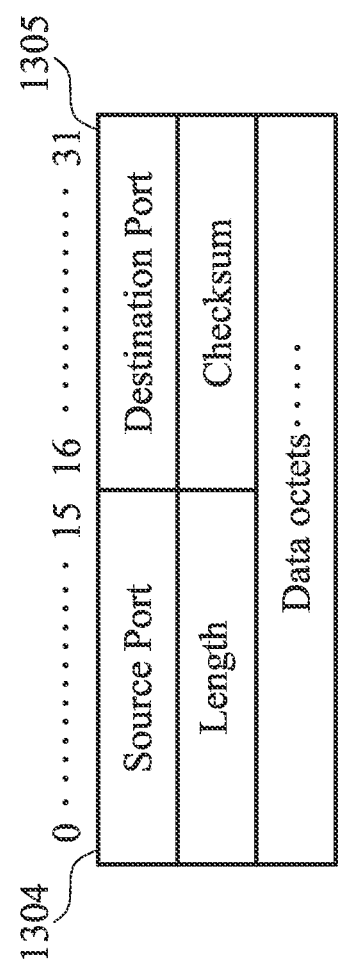
FIG. 13C shows a UDP Header and Payload Format of the IP packet shown in FIG. 13A.
Figure 13D:
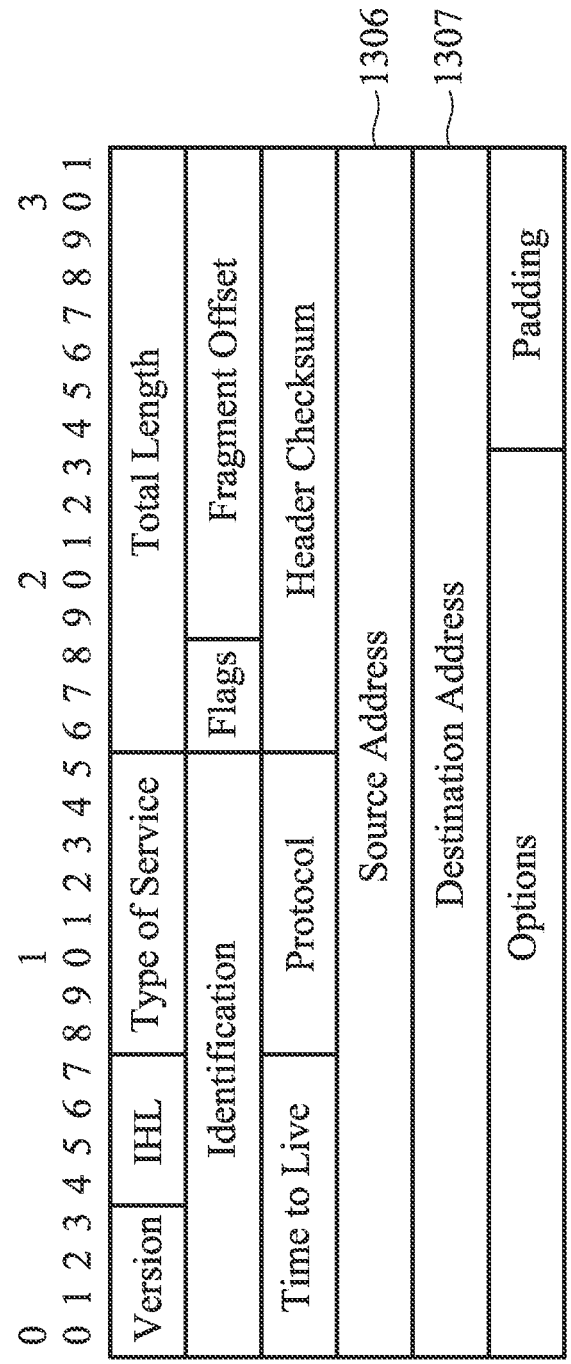
FIG. 13D shows a IP Header Format of the IP packet shown in FIG. 13A.
Figure 14:
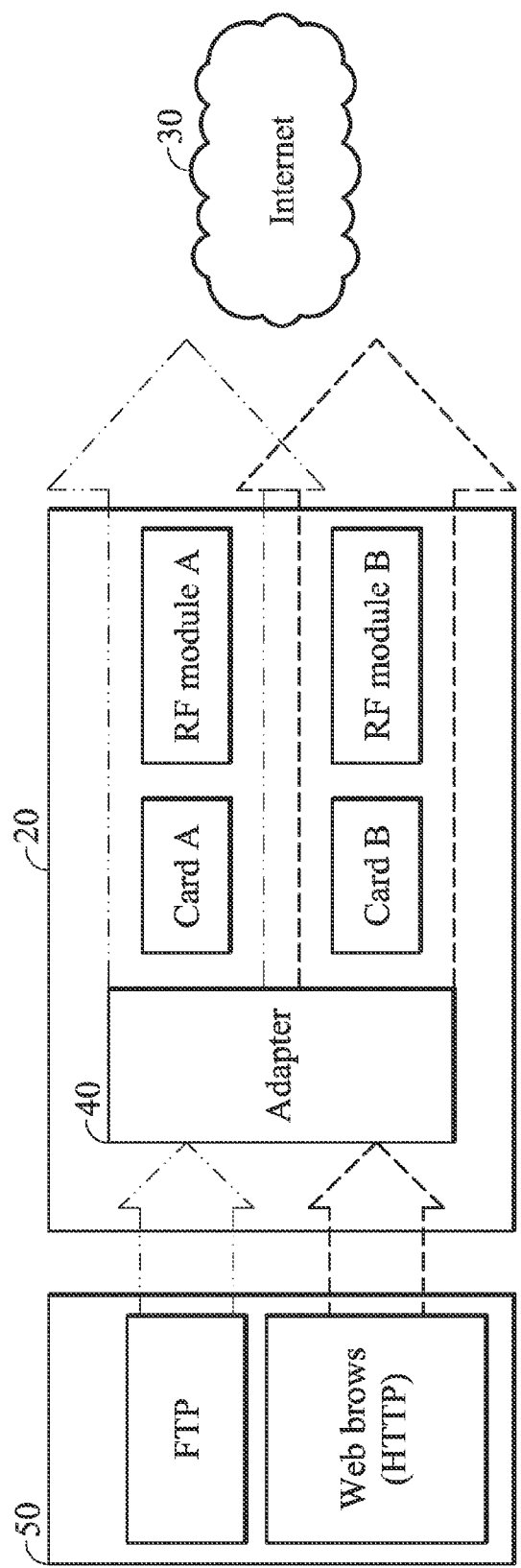
FIG. 14 shows a schematic diagram of a packet-switched data transmission according to an embodiment of the invention.

When receiving an uplink IP packet, the adapter 40 retrieves the destination port number 1303 or 1305 presented in the TCP/UDP header 1301 of the IP packet, as shown in FIGS. 13A-13D. FIGS. 13B-13D illustrate an exemplary TCP header and payload format, an exemplary UDP header and payload format and an exemplary IP header format respectively. The adapter 40 determines which subscriber identity card will be used to transmit the uplink IP packet according to the inspected port number 1303 or 1305 and pre-assignments of the subscriber identity cards. For example, as shown in FIG. 14, an IP packet corresponding to an FTP service is to be transmitted to a destination through the pre-assigned Card A and the RF module A while an IP packet corresponding to an HTTP service is to be transmitted through the pre-assigned Card B and the RF module B, wherein the FTP and HTTP services are requested by a device 50 which may be the computer host 10 or the MMI resident in the mobile station 20. If the source IP address 1306 of the uplink IP packet is different from the IP address of the pre-assigned subscriber identity card and RF module, the adapter 40 updates the source address 1306 of the uplink IP packet with a corresponding IP address before transmission. It is to be understood that the IP address of the pre-assigned subscriber identity card is a PDP address acquired from the GPRS network after successful GPRS Attach. Such determination may be recorded in an assignment table and stored in a volatile memory device of the mobile station 20. Exemplary mappings in the assignment table between original source addresses, modified source addresses, destination port numbers, service types and served subscriber identity cards are shown in FIG. 15.

When receiving a downlink IP packet, the adapter 40 retrieves the destination port number presented in the TCP/UDP header of the IP packet. The adapter 40 determines which service the downlink IP packet is for. The adapter 40 determines whether to update the destination IP address of the downlink IP packet with the original IP address according to the above-mentioned assignment table before sending it to the device 50, e.g. the computer host 10 or the MMI resident in the mobile station 20.

Figure 16:
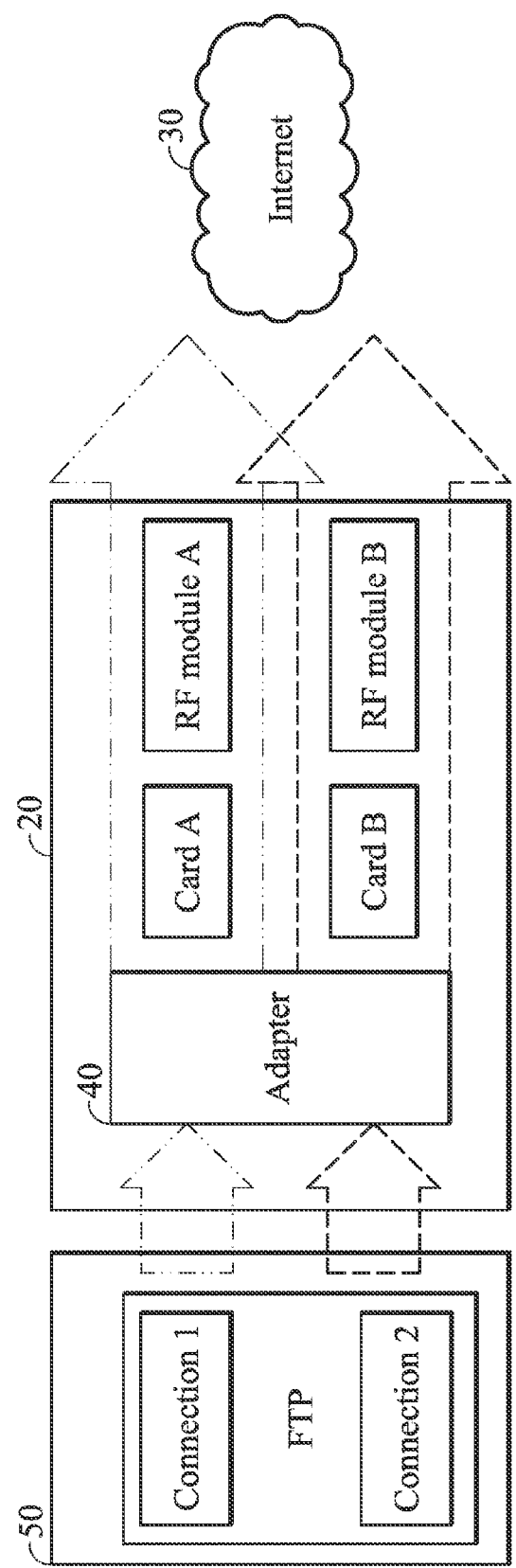
FIG. 16 shows a schematic diagram of a packet-switched data transmission according to another embodiment of the invention.

In some embodiments, when receiving an uplink IP packet, the adapter 40 retrieves a TCP/UDP packet from the payload of the received IP packet, as shown in FIGS. 13A-13D, and acquires information regarding a connection stream, which is composed of the protocol type (TCP or UDP), a source address, a source port number, a destination address and a destination port number. In an example, the source and destination addresses 1306 and 1307 may be acquired from the IP header and the source and destination port numbers 1302/1304 and 1303/1305 may be acquired from the TCP/UDP header. For file transmissions using the FTP, the adapter 40 may assign one subscriber identity card for a particular connection stream according to utilization of at least one of the Tx and Rx buffers. It is to be understood that a Tx buffer and a Rx buffer are allocated for each RF module, where the Tx and Rx buffers may be disposed in the corresponding Baseband chip (e.g. 220A or 220B of FIG. 2) or outside of the Baseband chips. The Tx buffer is utilized to store transformed blocks waiting to be transmitted via a corresponding RF module. The Rx buffer is utilized to store data from a corresponding RF module, which is waiting to be processed by a corresponding MCU. Following information acquisition, the adaptor 40 inspects whether a particular subscriber identity card has been assigned to the acquired connection stream. Such assignment may be recorded in an assignment table and stored in a volatile memory device of the mobile station 20. If so, the adaptor 40 determines that the uplink IP packet is going to be transmitted via the previously assigned subscriber identity card and the RF module corresponding to the previously assigned subscriber identity card. Otherwise, the adaptor 40 may inspect the Tx and/or Rx buffer occupancy and determine that the uplink IP packet is going to be transmitted via the subscriber identity card that corresponds to the RF module with lower Tx buffer occupancy (i.e. less blocks queued in a corresponding Tx buffer), lower Rx buffer occupancy (i.e. less data queued in a corresponding Rx buffer) or a combination thereof After determination, the adaptor 40 further records this determination in the assignment table. For example, as shown in FIG. 16, whether an IP packet corresponding to an FTP service of an undetermined connection stream is to be transmitted to a destination through the Card A or the Card B is determined according to information regarding the Tx or Rx buffer occupancy of the corresponding RF module thereof Exemplary mappings in the assignment table between source addresses, destination addresses, source ports, destination ports, protocols and served subscriber identity cards are shown in FIG. 17.

In some embodiments, the device 50 (e.g. the computer host 10 or the MMI resident in the mobile station 20) may request a Web page such as an HTML page, a WAP page or others through the mobile station 20. To acquire an HTML or WAP page, at least one request is issued to a Web server for requesting the related files, such as HTML or WAP files containing java scripts, VB scripts, HTML or WAP tags, image files, video stream files, audio stream files, execution program files, data files, or others. When receiving an uplink IP packet, the adapter 40 retrieves and parses the payload 1308 of the uplink IP packet and acquires information regarding that a particular file type corresponding to a requested Web page, such as an HTML or WAP file, an image file, a video stream file, a audio stream file, an executable program file, a data file, or others. The subscriber identity cards may be pre-assigned to serve different file type requests, respectively. For example, the Card A is utilized to serve HTML/WAP, video stream and executable program file requests while the Card B is utilized to serve image, audio stream, data file requests. Exemplary mappings in the assignment table between file types of HTTP/WAP requests and served subscriber identity cards are shown in FIG. 18, where such mappings are configurable. The mappings may be implemented in an array, a linked list, or others, and are stored in a non-volatile/volatile memory device of the mobile station 20.

Figure 19:
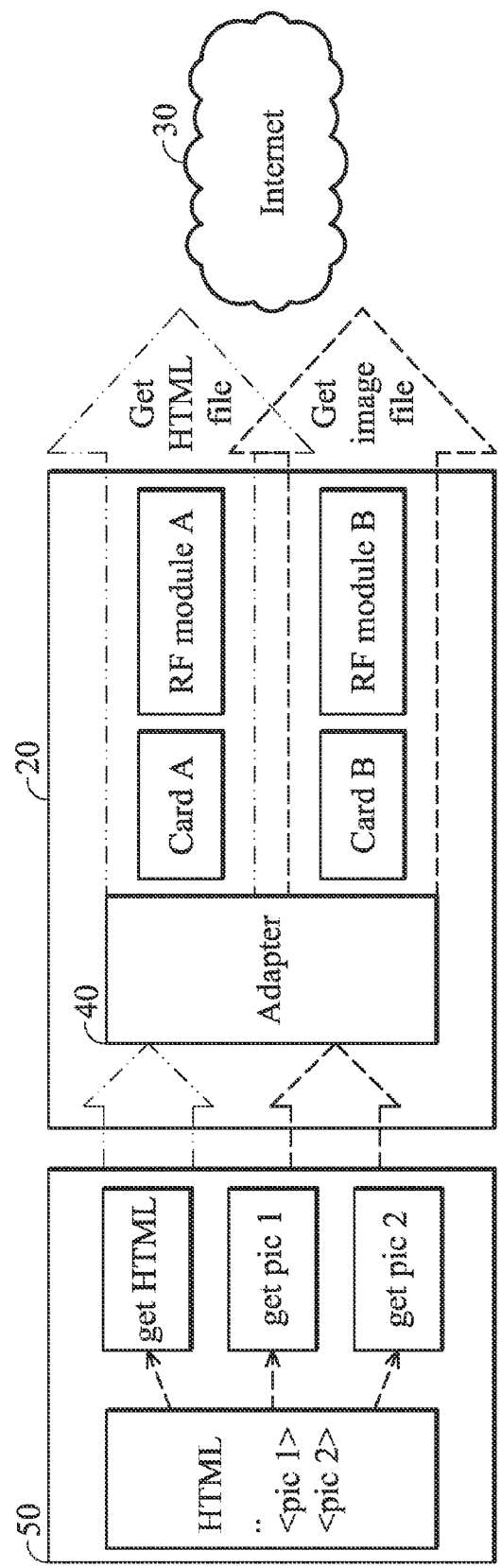
FIG. 19 shows a schematic diagram of a packet-switched data transmission according to an embodiment of the invention.

Furthermore, the adapter 40 determines which subscriber identity card will be used to transmit the uplink IP packet according to the inspected file type and pre-assignments of subscriber identity cards. For example, as shown in FIG. 19, an IP packet corresponding to an HTML file request is to be transmitted to a destination through the pre-assigned Card A and the RF module A, while an IP packet corresponding to an image file request is to be transmitted through the pre-assigned Card B and the RF module B.

In some embodiments, for Web page acquisition using HTTP or WAP, the adapter 40 may assign one subscriber identity card for the uplink IP packet containing an HTTP or WAP request according to utilization of at least one of the Tx and Rx buffers. Following information acquisition from the IP packet, the adaptor 40 may inspect the Tx and/or Rx buffer occupancy and determine that the uplink IP packet is going to be transmitted via the subscriber identity card that corresponds to the RF module with lower Tx buffer occupancy (i.e. less blocks queued in a corresponding Tx buffer), lower Rx buffer occupancy (i.e. less data queued in a corresponding Rx buffer) or a combination thereof.

In some embodiments, an applications such as a Web browser or others, executed in the computer host 10 or the MMI resident in the mobile station 20 may realize that the IP(A) and IP(B) are assigned pairs of the Card A with the RF module A and the Card B with the RF module B. Moreover, for requesting a Web page displaying or playing several file types as shown in FIG. 19, the application may have its native logic for generating several file type requests each requesting a Web server for a specific file type. The application may generate different IP packets to encapsulate the requests, assign IP(A) to the source address of IP packets corresponding to certain file types and assign IP(B) to the source address of the other IP packets, and then forward the uplink IP packets to the adapter 40. The adapter 40 may directly inspect a source IP address therein, accordingly determine one of Cards A and B, reorganize the IP packets into blocks as shown in FIG. 7 or 9, and direct the designated subscriber identity card and its corresponding RF module to transmit the blocks.

In some embodiments, the device 50 (e.g. the computer host 10 or the MMI resident in the mobile station 20) may request a multimedia stream via the mobile station 20, such as an audio stream, a video stream, or the like. The multimedia streaming requests may correspond to a Session Description Protocol (SDP) document, for example, in which comprises statements:

For audio part:
    m=audio 0 RTP/AVP 97; and
    a=control: streameID=0.

For video part:
    m=video 0 RTP/AVP 98; and
    a=control:streamID=1, where RTP/AVP 97 and 98 indicates a codec type for an audio and a video part, respectively.

Figure 20:
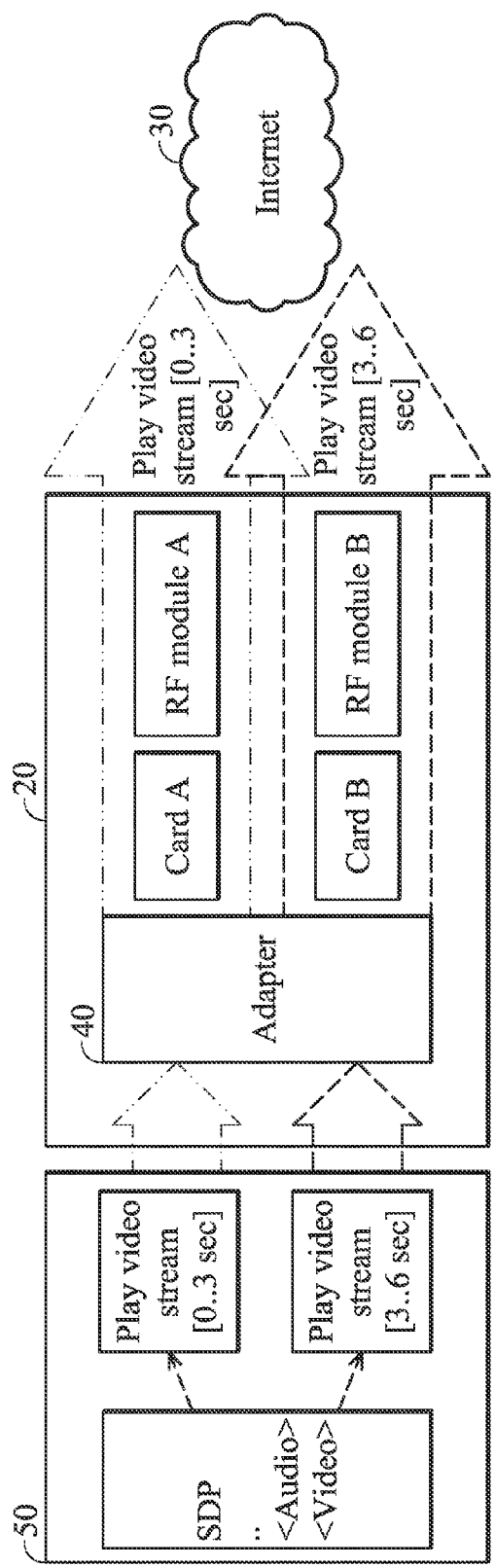
FIG. 20 shows a schematic diagram of a packet-switched data transmission according to an embodiment of the invention.

To buffer a sufficient portion of a video stream more efficiently, taking examples shown in FIG. 20, the adapter 40 may parse the payloads 1308 of the uplink IP packets to comprehend that the encapsulated request is a multimedia streaming request, generate two different requests, one requesting for 0 to 3 seconds of an audio/video stream and the other requesting 3 to 6 seconds of the audio/video stream, assuming that a 6-second buffer is necessary for smooth video stream playback. The adaptor 40 may further generate different IP packets to encapsulate the generated requests and transmit the generated IP packets to a multimedia streaming server through the Cards A and B respectively. Specifically, the adapter 40 may assign subscriber identity card A to request 0 to 3 seconds of the video stream but assign subscriber identity card B to request 4 to 6 seconds of the video stream. For example, FIG. 21 shows an exemplary SDP document. In the SDP document of FIG. 21, SETUP, PLAY and PAUSE instructions are utilized to request different time periods of the multimedia stream, wherein "npt" is the abbreviation of "normal play time" which indicates the absolute position relative to the beginning of the multimedia content. It is to be understood that the adaptor 40 may also assemble the returned video streams responding to the issued requests as a single video stream and respond to the device.

In some embodiments, an applications such as a multimedia player or others, executed in the computer host 10 or the MMI resident in the mobile station 20 may realize that the IP(A) and IP(B) are assigned pairs of the Card A with the RF module A and the Card B with the RF module B. Moreover, for an audio/video stream, the application may have its native logic for generating two multimedia streaming requests one requesting a multimedia streaming server for a first time period of an audio/video stream from the beginning and the other requesting for a second time period subsequent to the first time period as shown in FIG. 20. The application may generate different IP packets to encapsulate the generated requests, assign the IP(A) to the source address of one or more IP packets corresponding to the first time period multimedia streaming request and assign the IP(B) to the source address of the other IP packets, and then forward the uplink IP packets to the adapter 40. The adapter 40 may directly inspect a source IP address therein, accordingly determine one of Cards A and B, reorganize the IP packets into blocks as shown in FIG. 7 or 9, and direct the designated subscriber identity card and its corresponding RF module to transmit the blocks.

Figure 22:
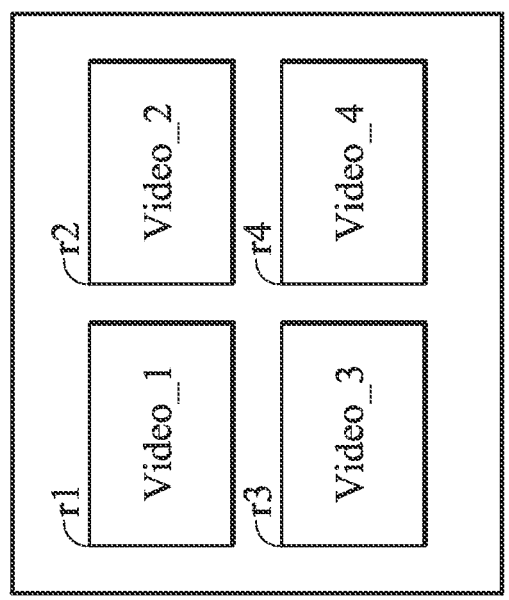
FIG. 22 shows a schematic diagram of a packet-switched data transmission according to an embodiment of the invention.

In some embodiments, the device 50 (e.g. the computer host 10 or the MMI resident in the mobile station 20) may request multiple multimedia streams on a Web page, such as audio streams, video streams or others through the MS using Real Time Streaming Protocol (RTSP). The adapter 40 may parse the payloads 1308 of the uplink IP packets to comprehend the encapsulated request. And then, the adapter 40 may assign subscriber identity card A to issue certain of the multimedia stream requests while assign subscriber identity card B to issue the others. The source address of each uplink IP packet is accordingly set to the IP(A) or IP(B). Taking a Web page containing four areas each playing a video stream as an example as shown in FIG. 22, where the Web page is drawn according to a Synchronized Multimedia Integration Language (SMIL) document shown in FIG. 23, the multimedia streaming requests correspond to RTSP requests "rtsp://server/video/v1.3gpp" for a region "r1", "rtsp://server/video/v2.3gpp" for a region "r2", "rtsp://server/video/v3.3gpp" for a region "r3" and "rtsp://server/video/v4.3gpp" for a region "r4" of the Web page. Taking examples shown in FIG. 24, RTSP requests for regions "r1" and "r2" are issued to a multimedia streaming server via the Card A and the RF module A while RTSP requests for regions "r3" and "r4" are issued thereto via the Card B and the RF module B. Furthermore, as described above, the adapter 40 may arrange the subscriber identity cards for the RTSP requests according to utilization of at least one of the Tx and Rx buffers. For example, when the Tx and/or Rx buffer occupancy of the RF module A is better than that of the RF module B, RTSP requests for regions "r1", "r2" and "r3" are issued to a multimedia streaming server via the Card A and the RF module A while RTSP requests for region "r4" is issued thereto via the Card B and the RF module B. It is to be understood that the adaptor 40 may also respond the returned multimedia streams responding to the issued requests to the device 50.

In some embodiments, an applications such as a Web browser or others, executed in the computer host 10 or the MMI resident in the mobile station 20 may realize that the IP(A) and IP(B) are assigned pairs of the Card A with the RF module A and the Card B with the RF module B. Moreover, for requesting a Web page playing multiple multimedia files as shown in FIG. 22, the application may have its native logic for generating several multimedia streaming requests each requesting a multimedia streaming server for a specific audio/video stream. The application may generate different IP packets to encapsulate the requests, assign IP(A) to the source address of IP packets corresponding to certain multimedia streaming requests and assign IP(B) to the source address of the other IP packets, and then forward the uplink IP packets to the adapter 40. The adapter 40 may directly inspect a source IP address therein, accordingly determine one of Cards A and B, reorganize the IP packets into blocks as shown in FIG. 7 or 9, and direct the designated subscriber identity card and its corresponding RF module to transmit the blocks.

Figure 25:
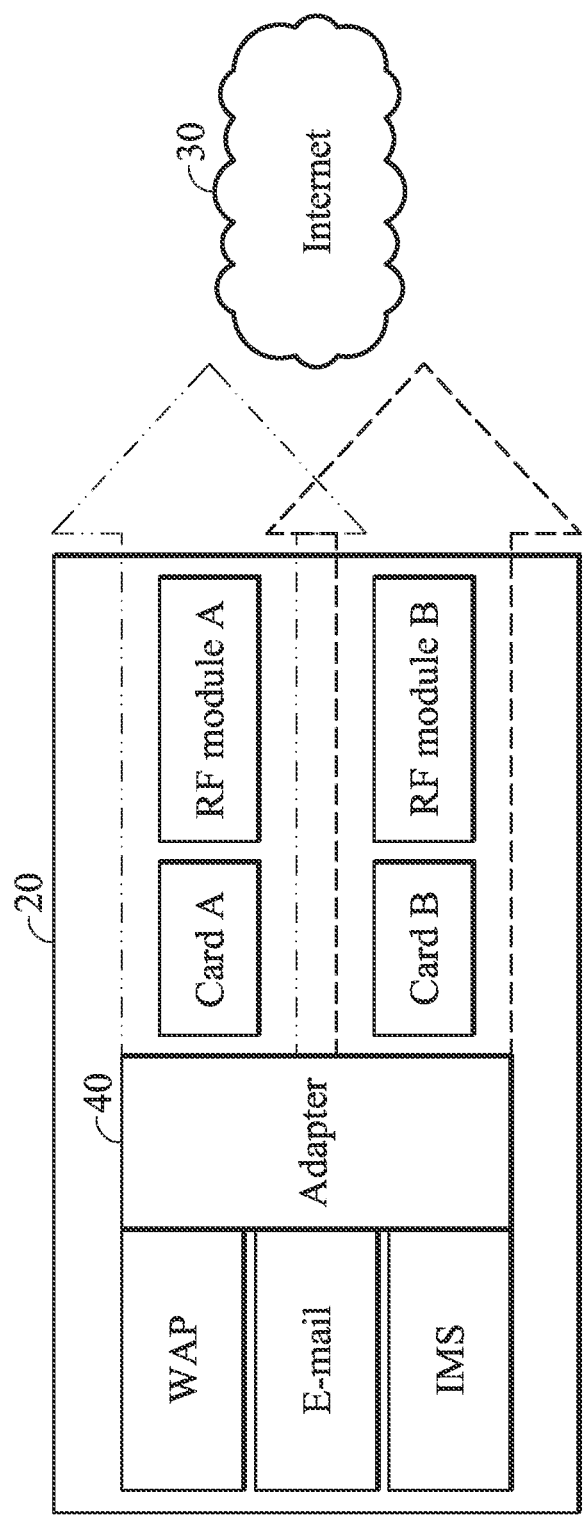
FIG. 25 shows a schematic diagram of a packet-switched data transmission according to an embodiment of the invention.

In some embodiments, applications such as a WAP browser, an E-mail client, an instant messaging service (IMS) client, an FTP client and so on, executed in the computer host 10 or the MMI resident in the mobile station 20 may realize that the IP(A) and IP(B) are assigned pairs of the Card A with the RF module A and the Card B with the RF module B, as shown in FIG. 25. Moreover, each application may have its native logic for determining that uplink IP packets are going to be transmitted by which subscriber identity card, accordingly providing relevant source IP addresses 1306 in the uplink IP packets and then forwarding the uplink IP packets to the adapter 40. The adapter 40 may directly inspect a source IP address therein, accordingly determine one of Cards A and B, reorganize the IP packets into blocks as shown in FIG. 7 or 9, and direct the designated subscriber identity card and its corresponding RF module to transmit the blocks.

Figure 24:
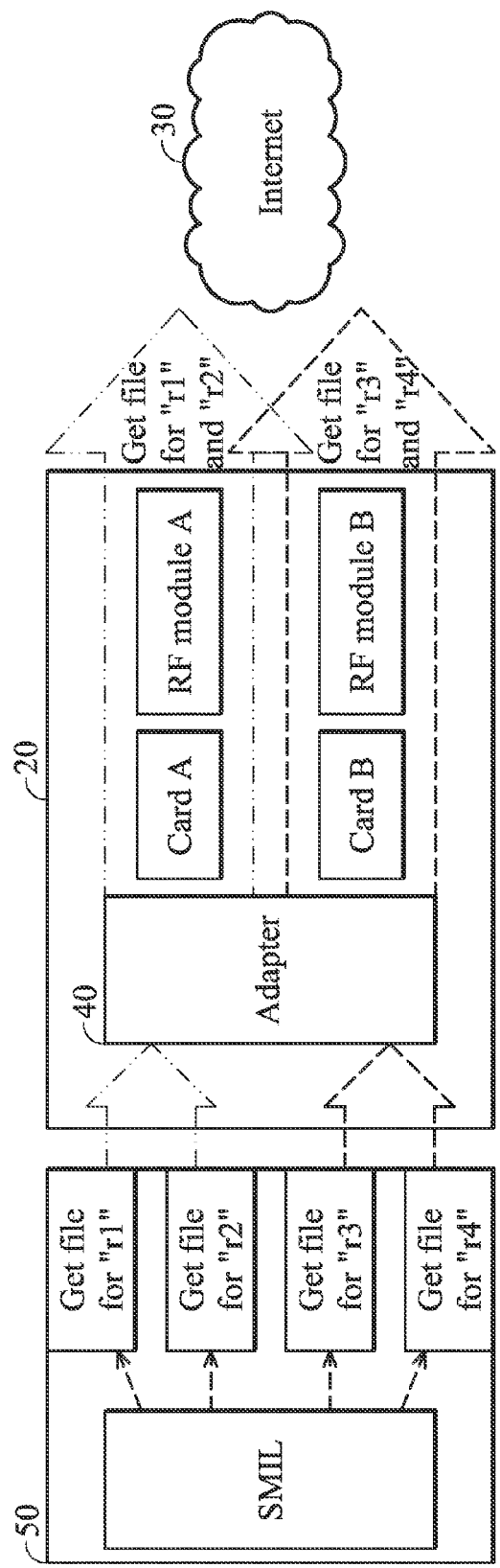
FIG. 24 shows a schematic diagram of a packet-switched data transmission according to an embodiment of the invention.
Figure 26:
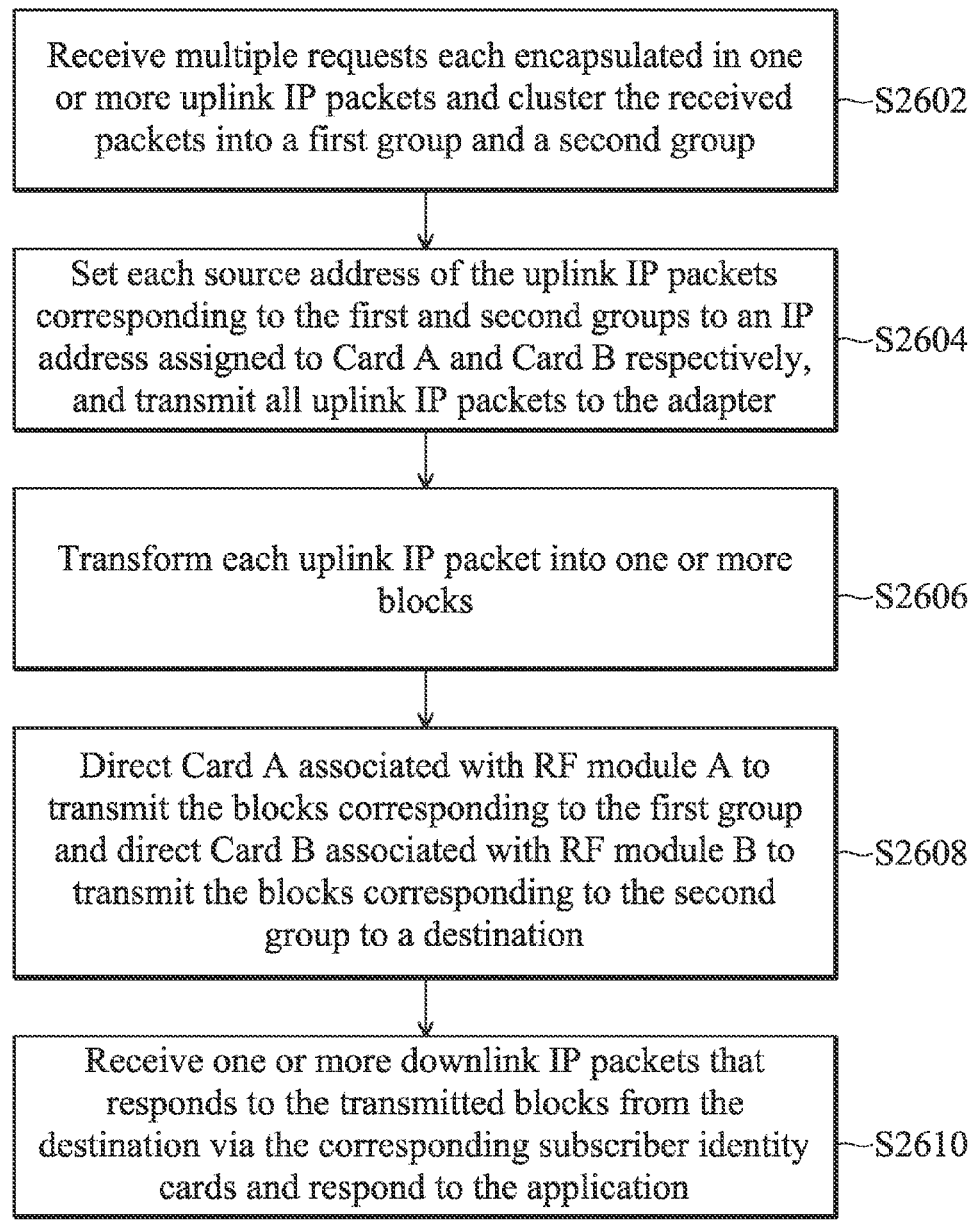
FIG. 26 shows a flow chart illustrating a method for handling packet-switched data transmissions according to an embodiment of the invention.

FIG. 26 shows a flow chart illustrating a method for handling packet-switched data transmissions according to an embodiment of the invention. First, the application executed in the computer host 10 or in the MMI resident in the mobile station 20 may receive multiple requests each encapsulated in one or more uplink IP packets, and cluster the received ones into a first group and a second group (step S2602). The requests may be the file type requests as shown in FIG. 19, or multimedia streaming requests as shown in FIG. 20 or 24. Next, the application sets each source address of the header of the uplink IP packets corresponding to the first group to an IP address assigned to the subscriber identity card A, sets each source address of the header of the uplink IP packets corresponding to the second group to an IP address assigned to the subscriber identity card B and transmits all uplink IP packets to the adapter 40 (step S2604). Subsequently, the adapter 40 transforms each uplink IP packet into one or more blocks (step S2606). Next, the adapter 40 directs the Card A associated with the RF module A to transmit the blocks corresponding to the first group and directs the Card B associated with the RF module B to transmit the blocks corresponding to the second group to a destination via the corresponding camped on cells and registered wireless telecommunication networks (step S2608). Details of transformation into one or more blocks may refer to descriptions of FIG. 7 or 9. Next, the adapter 40 may receive one or more downlink IP packets that responds to the transmitted blocks from the destination via the corresponding subscriber identity cards and respond to the application (step S2610).

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system for handling packet-switched data transmission, accompanying with a first radio frequency (RF) module, a second RF module, a first socket, into which a first subscriber identity card can be inserted, wherein the first subscriber identity card, when being inserted, camps on a cell via the first RF module, and a second socket, into which a second subscriber identity card can be inserted, wherein the second subscriber identity card, when being inserted, camps on the same cell or a different cell via the second RF module, comprising:
- processor logic for clustering a plurality of requests each encapsulated in one or more uplink Internet Protocol (IP) packets into a first group and a second group;
- processor logic for setting a first IP address corresponding to the first subscriber identity card as a source address of each IP packet of the first group;
- processor logic for setting a second IP address corresponding to the second subscriber identity card as a source address of each IP packet of the second group; and
- processor logic for transmitting the uplink IP packets to an adaptor responsible for transforming IP packets into a plurality of blocks and directing the first RF module and the second RF module to transmit the transformed blocks.

2. The system as claimed in claim 1, wherein each request is a particular file type request requesting one of a HyperText Markup Language (HTML) file, a Wireless Application Protocol (WAP) file, an image file, an audio stream file, a video stream file, an executable program file and a data file.

3. The system as claimed in claim 2, further comprising:
- processor logic for assigning the first subscriber identity card to serve one or more file type requests, and assigning the second subscriber identity card to serve another file type requests; and
- processor logic for clustering the file type requests into one of the first group and the second group according to the assignments.

4. The system as claimed in claim 3, wherein the hardware status is a transmission (Tx) or receiving (Rx) buffer occupancy corresponding to the first subscriber identity card, or a Tx or Rx buffer occupancy corresponding to the second subscriber identity card, or any combination thereof.

5. The system as claimed in claim 2, further comprising processor logic for clustering the file type requests into the first group and the second group according to at least one hardware status.

6. The system as claimed in claim 1, wherein the request corresponding to the first group requests for a first time period of an audio or video stream file, and the request corresponding to the second group requests for a second time period of the audio or video stream file, wherein the second time period is subsequent to the first time period.

7. The system as claimed in claim 1, wherein each request requests for an audio or video stream file in the same Web page.

8. The system as claimed in claim 1, further comprising:
- the first RF module;
- the second RF module;
- processor logic obtaining the first IP address from a data network after a successful registration procedure via the first RF module; and
- processor logic obtaining the second IP address from a data network after a successful registration procedure via the second RF module.

9. A system for handling packet-switched data transmission, accompanying with a first radio frequency (RF) module, a second RF module, a first socket, into which a first subscriber identity card can be inserted, wherein the first subscriber identity card, when being inserted, camps on a cell via the first RF module, and a second socket, into which a second subscriber identity card can be inserted, wherein the second subscriber identity card, when being inserted, camps on the same cell or a different cell via the second RF module, comprising:
- processor logic for receiving an uplink Internet Protocol (IP) packet;
- processor logic for collecting information regarding at least one of the received packet and a specific assignment;
- processor logic for determining one subscriber identity card from the first and second subscriber identity cards according to the collected information;
- processor logic for updating a source address of the received packet in response to the determined subscriber identity card;
- processor logic for transforming the updated packet into one or more blocks in response to the determined subscriber identity card;
- processor logic for transmitting the transformed blocks to an IP network via the RF module corresponding to the determined subscriber identity card.

10. The system as claimed in claim 9, further comprising:
- processor logic for recording the determination in a memory device;
- processor logic for receiving a downlink IP packet;
- processor logic for updating a destination address of the received downlink IP packet according to the determination stored in the memory device.

11. The system as claimed in claim 9, further comprising a volatile or non-volatile memory device storing the specific assignment indicating that the first and second subscriber identity cards are pre-assigned to serve different types of services respectively, wherein the circuit determines the subscriber identity card according to the specific assignment and a service type of the received packet, wherein the service type of the received packet is obtained according to a destination port number presented in the transmission control protocol/user datagram protocol (TCP/UDP) header of the received packet.

12. The system as claimed in claim 9, further comprising:
- a first transmission buffer and a first receiving buffer corresponding to the first RF module; and
- a second transmission buffer and a second receiving buffer corresponding to the second RF module,
- wherein processor logic determines the subscriber identity card according to utilization of the transmission and receiving buffers, so as to transmit the received packet via the subscriber identity card with lower transmission buffer occupancy, lower receiving buffer occupancy or a combination thereof.

13. The system as claimed in claim 9, further comprising a volatile or non-volatile memory device storing the specific assignment indicating that the first and second subscriber identity cards are pre-assigned to serve different file type requests respectively, wherein the circuit determines the subscriber identity card according to the specific assignment and a file type request of the received packet, wherein the file type request of the received packet is obtained according to a payload of the received packet.

14. A system for handling packet-switched data transmission, accompanying with a first radio frequency (RF) module, a second RF module, a first socket, into which a first subscriber identity card can be inserted, wherein the first subscriber identity card, when being inserted, camps on a cell via the first RF module, and a second socket, into which a second subscriber identity card can be inserted, wherein the second subscriber identity card, when being inserted, camps on the same cell or a different cell via the second RF module, comprising:

processor logic for receiving a request requesting for an audio or video stream file;

processor logic for generating two multimedia streaming requests one for requesting for a first time period of the audio or video stream file and the other for requesting for a second time period of the audio or video stream file;

processor logic for determining the first subscriber identity card for one generated multimedia streaming request;

processor logic for determining the second subscriber identity card for the other generated multimedia streaming request;

processor logic for generating a first Internet Protocol (IP) packet comprising a first IP address as a first source address and a second IP packet comprising a second IP address as a second source address to encapsulate the generated multimedia streaming requests respectively;

processor logic for transmitting the generated first IP packet to a multimedia streaming server on an IP network via the first RF module; and processor logic for transmitting the generated second IP packet to the multimedia streaming server on the IP network via the second RF module.

15. The system as claimed in claim 14, wherein the first time period is from the beginning of the audio or video stream and the second time period is substantially subsequent to the first time period.

16. A system for handling packet-switched data transmission, accompanying with a first radio frequency (RF) module, a second RF module, a first socket, into which a first subscriber identity card can be inserted, wherein the first subscriber identity card, when being inserted, camps on a cell via the first RF module, and a second socket, into which a second subscriber identity card can be inserted, wherein the second subscriber identity card, when being inserted, camps on the same cell or a different cell via the second RF module, comprising:

processor logic for receiving a first request requesting for a first file on a Web page, and a second request requesting for a second file on the same Web page;

processor logic for determining the first subscriber identity card for the first request;

processor logic for determining the second subscriber identity card for the second request;

processor logic for generating a first Internet Protocol (IP) packet comprising a first IP address as a first source address and a second IP packet comprising a second IP address as a second source address to encapsulate the first and second requests respectively;

processor logic for transmitting the generated first IP packet to a Web server on an IP network via the first RF module; and processor logic for transmitting the generated second IP packet to the same or a different Web server on the IP network via the second RF module.

17. The system as claimed in claim 16, wherein any of the first and second files is one of a HyperText Markup Language (HTML) file, a Wireless Application Protocol (WAP) file, an image file, an audio stream file, a video stream file, an executable program file and a data file.

18. A system for handling packet-switched data transmission, accompanying with a plurality of radio frequency (RF) modules and a plurality of sockets, into which a plurality of subscriber identity cards can be inserted respectively, wherein the plurality of subscriber identity cards, when being inserted, camp on a plurality of cells via the plurality of RF modules, comprising:

processor logic for clustering a plurality of requests each encapsulated in one or more uplink Internet Protocol (IP) packets into a plurality of groups;

processor logic for setting a plurality of IP addresses corresponding to the plurality of subscriber identity cards as a source address of each IP packet of the plurality of groups; and processor logic for transmitting the uplink IP packets to an adaptor responsible for transforming IP packets into a plurality of blocks and directing the plurality of RF modules to transmit the transformed blocks.

19. A system for handling packet-switched data transmission, accompanying with a plurality of radio frequency (RF) modules and a plurality of sockets, into which a plurality of subscriber identity cards can be inserted respectively, wherein the plurality of subscriber identity cards, when being inserted, camps on a plurality of cells via the plurality RF modules, comprising:

processor logic for receiving an uplink Internet Protocol (IP) packet;

processor logic for collecting information regarding at least one of the received packet and a specific assignment;

processor logic for determining one subscriber identity card from the plurality of subscriber identity cards according to the collected information;

processor logic for updating a source address of the received packet in response to the determined subscriber identity card;

processor logic for transforming the updated packet into one or more blocks in response to the determined subscriber identity card;

processor logic for transmitting the transformed blocks to an IP network via the RF module corresponding to the determined subscriber identity card.

20. A system for handling packet-switched data transmission, accompanying with a plurality of radio frequency (RF) modules and a plurality of sockets, into which a plurality of subscriber identity cards can be inserted, wherein the plurality of subscriber identity cards, when being inserted, camps on a plurality of cells via the plurality of RF modules, comprising:

processor logic for receiving a request requesting for an audio or video stream file;

processor logic for generating a plurality of multimedia streaming requests for requesting for a plurality of time periods of the audio or video stream file;

processor logic for determining one subscriber identity card from the plurality of subscriber identity cards for each generated multimedia streaming request;

processor logic for generating a plurality of Internet Protocol (IP) packets each comprising an IP address as a source address to encapsulate the generated multimedia streaming requests respectively;

processor logic for transmitting the generated plurality of IP packets to a multimedia streaming server on an IP network via the plurality of RF modules.

21. A system for handling packet-switched data transmission, accompanying with a plurality of radio frequency (RF) modules and a plurality of sockets, into which a plurality of subscriber identity cards can be inserted, wherein the plurality of subscriber identity cards, when being inserted, camps on a plurality of cells via the plurality of RF modules, comprising:

processor logic for receiving a plurality of requests requesting for a plurality of files on a Web page;

processor logic for determining one subscriber identity card from the plurality of subscriber identity cards for each request;

processor logic for generating a plurality of Internet Protocol (IP) packets each comprising an IP address as a source address to encapsulate the plurality of requests respectively;

processor logic for transmitting the generated IP packets to a Web server on an IP network via the plurality of RF modules.

* * * * *